US012766475B2

(12) United States Patent
Wada

(10) Patent No.: US 12,766,475 B2
(45) Date of Patent: Oct. 20, 2026

(54) HIGH-TEMPERATURE-HIGH-PRESSURE PROCESSING UNIT BY SOLVENT APPLICATION OF PRESSURE

(71) Applicant: Ryutaro Wada, Tokyo (JP)

(72) Inventor: Ryutaro Wada, Tokyo (JP)

( * ) Notice: Subject to any disclaimer, the term of this patent is extended or adjusted under 35 U.S.C. 154(b) by 654 days.

(21) Appl. No.: 18/281,563

(22) PCT Filed: May 12, 2022

(86) PCT No.: PCT/JP2022/020084
§ 371 (c)(1),
(2) Date: Sep. 12, 2023

(87) PCT Pub. No.: WO2022/249893
PCT Pub. Date: Dec. 1, 2022

(65) Prior Publication Data

US 2024/0042403 A1 Feb. 8, 2024

(30) Foreign Application Priority Data

May 26, 2021 (JP) ................................ 2021-088698

(51) Int. Cl.
*B01J 3/06* (2006.01)
*B30B 5/02* (2006.01)

(52) U.S. Cl.
CPC ................ *B01J 3/06* (2013.01); *B01J 3/065* (2013.01); *B30B 5/02* (2013.01); *B01J 2203/061* (2013.01); *B01J 2203/0655* (2013.01)

(58) Field of Classification Search
CPC ........ B01J 3/06; B01J 3/065; B01J 2203/061; B01J 2203/0655; B01J 2203/0625
See application file for complete search history.

(56) References Cited

U.S. PATENT DOCUMENTS

2006/0292302 A1 12/2006 Chodelka et al.

FOREIGN PATENT DOCUMENTS

JP S63-319039 A 12/1988
JP H11-42283 A 2/1999
(Continued)

OTHER PUBLICATIONS

International Search Report for PCT/JP2022/020084 dated Jul. 26, 2022.
(Continued)

*Primary Examiner* — Lessanework Seifu
(74) *Attorney, Agent, or Firm* — Yokoi & Co., U.S.A.; Toshiyuki Yokoi

(57) ABSTRACT

To provide a hydrostatic pressure type high temperature and high-pressure treatment apparatus by a wet method and a dry method for efficiently mass-producing high-quality and large-sized synthetic diamond. In the treatment apparatus, a high-pressure cell prevented from the intrusion of a pressure medium into the inside is housed in a high-pressure container, and hydrostatic pressurization is performed by the liquid pressure medium. At least one pressurizing mechanism 10 for the pressure medium 6 is provided, and a pressure medium having a known compressibility and volume change rate is used. A heating mechanism for the pressure medium and a measuring means for the average temperature in the vertical direction are provided, the pressure medium is heated to a predetermined temperature to be thermally expanded, treatment is continued while maintaining the pressure even after the pressurizing mechanism is stopped, and two or more high-pressure cells 9 can be simultaneously subjected to high-temperature and high-pressure treatment at uniform pressure without directionality.

17 Claims, 10 Drawing Sheets

(56) References Cited

FOREIGN PATENT DOCUMENTS

| | | | |
|---|---|---|---|
| JP | 2008-546528 | A | 12/2008 |
| JP | 2013-113538 | A | 6/2013 |
| JP | 6649557 | B | 1/2015 |
| JP | 2017-70985 | A | 4/2017 |
| JP | 2020-185595 | A | 11/2020 |
| JP | 2021-4692 | A | 1/2021 |
| JP | 7046342 | B | 4/2022 |

OTHER PUBLICATIONS

Hitoshi Kakutani, "Recent Advances in High Pressure Apparatus for Diamond Synthesis", High pressure science and technology, vol. 19, No. 4, pp. 264-269, (2009).

Anton Shatskiy.et.al, Press less split-sphere apparatus equipped with scaled-up Kawai-cell for mineralogical studies at 10-20 GPa, American Mineralogist, vol. 96, pp. 541-548, (2011).

Hiroaki Kajikawa (AIST), "Reliable Pressure Measurements from National Pressure Standards to Measurements in Industrial Fields", Journal of the Japan Society for Precision Engineering/Journal of the Japan Society for Precision Engineering vol. 83, No. 7, pp. 651-655, (2017).

Yoshikazu Kishi (Kobelco), "High Pressure Processing Equipment for Food and Biotechnology Fields", R&D Kobe Steel Engineering Reports, vol. 58, No. 2, pp. 24-27 (Aug. 2008).

Fig. 2 Compression of Various Alcohols
PC: 1, 2-Propanediol (Propylene glycol)
EG: 1, 2-Ethanediol (Ethylene glycol)

Fig. 8 Compression of Various (Alcohol + Water) Solutions

Citation) Kaoru Makita, Pressure effect on thermophysical properties of organic liquids, Thermophysical Properties, Vol.1, No.1 (1987)

HIGH-TEMPERATURE-HIGH-PRESSURE PROCESSING UNIT BY SOLVENT APPLICATION OF PRESSURE

TECHNICAL FIELD

The present invention relates to a manufacturing apparatus using a hydrostatic pressurization type high-temperature high-pressure method. This device efficiently mass-produces large-sized synthetic diamonds.

BACKGROUND OF THE INVENTION

Since diamond is thermodynamically stable under high pressure, its synthesis is usually carried out under static high pressure of 5-6 GPa and 1300-1500° C. It was in the 1950s that a method for producing synthetic diamonds was discovered, and the history of production has already spanned half a century. Most of the synthetic diamonds currently produced are made by the static pressurization method among the high temperature and high-pressure methods (HPHT method). The temperature difference method is used to synthesize large single-crystal diamond. Its driving force is the solubility difference of diamond in the solvent caused by the temperature difference. The method and apparatus that produce relatively small synthetic diamonds of several millimeters (mm) or less in size by this method using graphite etc. as the raw material have been industrially established. Quality depends on impurity levels and crystallinity.

In many static pressing methods, diamond growth is accomplished by infiltrating and diffusing carbon into the metal film formed by the series of specific type of melted catalysts. Granular diamond is produced in the synthesis vessel in which the predetermined temperature gradient is created between the diamond seed material and the carbon source. When the growth time is lengthened, diamonds with its size of several millimeters or more can be produced. This requires relatively small temperature gradients and very careful regulation of temperature and pressure. However, this method requires a long time of one to several days depending on the size of the product. The conventional system occupies one processing unit to produce one synthetic diamond. Therefore, the growth time, i.e., the size of the product, determines the machine time.

There are many types of synthetic diamond production equipment. In the case of the static pressure method of the high temperature and high-pressure method, it basically consists of the pressure device and the high-pressure cells. The pressurizing device is used for generating high pressure and is roughly classified into the piston pressurizing method and the hydrostatic pressure pressurizing method. The high-pressure cell is the device that collects compressive force in an extremely small area while energizing and heating. There are many types of this in terms of shape and structure.

The piston pressurization method includes a vertically uniaxial high pressure press device and a mechanical pressurization method using multiaxial four or six press cylinders. The piston pressurization method is a general term for these methods. In the early days, the only way to pressurize the piston was a large uniaxial compression press, but due to technological progress over the past half century, 6-axis compression presses are now being widely used, mainly in China. Most of the current commercial production of synthetic diamond is by the piston pressurization method.

On the other hand, the hydrostatic pressurization method uses fluid as the pressure medium. The hydrostatic pressurization method can easily obtain static high pressure of which compression force and its direction are even (hereinafter referred to as "isotropic pressure"). However, its operation is known to be difficult. This method has been used mainly for academic research such as mineralogy and geology. The reason is that no technical improvements have been made so far. As such, this method is currently rarely used for commercial synthetic diamond production.

The high-pressure cells generate high pressure after being heated by electric heating. The high-pressure cells use the anvil made of super hard material to generate high pressure. When manufacturing synthetic diamond, the raw material such as graphite, the internal heating source, diamond seeds and the metal catalyst (these are called "processed material") are placed in the interior space of the anvil. As for the area of the end face of the anvil, the pressure receiving surface from the pressure device on the outside is large, and the sample surface on the inside is small. Therefore, when a compression force is applied from the outside, the working pressure applied to the raw material can be amplified 10 to 100 times depending on the area ratio. Heating by energization is mainly based on resistance heating by applying current to the heating source such as the anvil itself or the built-in heater. The heating source may be shared by the anvil. The high-pressure cells are composed of processed material, the heat source, and the anvil. A wide variety of methods have been developed and proposed for these high-pressure cells over the past half century and have been put to practical use.

Here, the correlation between the type of high-pressure cells and the pressurizing device will be explained. Conventionally, High-pressure cells applied to the piston pressurization method include 1) belt-type and 2) cubic type. Furthermore, the high-pressure cells applied to both the piston pressurization method and the hydrostatic pressure pressurization method include 3) split sphere type. The High-pressure cells of 2) and 3) above are collectively called the multi-anvil type apparatus (MAA). This is due to the use of multiple assembling anvils. Non-Patent Document 1 shows the concept and structure of these MAAs.

The belt-type 1) above is the first developed high-pressure cells. In this method, a cylindrical cell containing a sample is pressed from above and below through the anvil by the uniaxial compression press, and the upper and lower anvils are electrically heated to heat the sample. The advantage of the belt-type is that it is easy to operate and saves time and effort. However, the disadvantage is that the pressurization device is considerably larger. The cubic type in 2) above includes the tetrahedral type that compresses a regular tetrahedral sample with four hydraulic cylinders, and the cubic type that compresses the cubic (regular hexahedral) sample with six hydraulic cylinders. The raw material is heated by the heating source such as a heater installed inside the high-pressure cells. The cubic type has the smaller pressurizing device than the belt-type and is characterized by faster time to reach the pressure and temperature suitable for synthesizing diamond. In addition, since a relatively large volume can be secured in the 5 to 6 GPa range, the cubic type is suitable for the production of relatively small synthetic diamonds that are inexpensive in terms of quality. However, in 1) and 2) above, efforts are made to direct the compressive force in the uniaxial direction to the isotropic direction that approximates the shape of a sphere as much as possible. As a result, an excessive force is applied to the anvil and the press piston, which shortens their lives due to breakage and creep deformation, further increasing the wear frequency. It has already been mentioned that the pressurizing device in 1) above is quite large. Furthermore, in the above 2), the size of the anvil is increased in order to produce a larger size synthetic diamond with the cubic type of apparatus. That is the challenge for the device. The press pressure increases with the square of the dimension. Therefore, by now, mechanical devices are already approaching their limits.

According to Non-Patent Document 1, thousands of the cubic-type devices of 2) above using the 6-axis compression press were in operation in China at the time of 2009. As a result, large-sized synthetic diamonds with a diameter of 10 mm or less are produced. Also, according to another information, this 6-axis compression press is called a Chinese cubic Press (CCP). At present, the diameter of one press cylinder is 850 mm, and the maximum compressive force is about 60 MN. When converted to the pressure on the outer surface of the cubic high-pressure cells, the total pressure of the CCP corresponds to 110 MPa. Even if the sample is made as small as possible, the operating pressure of the cubic type (CCP) apparatus is limited to 25 GPa. According to Non-Patent Document 1, in this pressurization method, each of the six anvils must be synchronously run by each of the six-axis hydraulic units, which is difficult to handle and has a problem in workability.

Next, the segmented sphere type 3) above, which is the high-pressure cell that has been conventionally applied also to the hydrostatic pressurization method, will be described. In the case of the segmented sphere type described in 3) above, the anvil is assembled in two stages, with the external Anvil and the internal Anvil. Here, the processed material and the internal anvil are collectively referred to as the sample. In the split-sphere type high-pressure cells, the sample is placed at the center of the external Anvil (split-sphere) shaped by dividing a sphere into six or eight parts. All these High-pressure cells are encased in the rubber shell. The rubber shell is fluid intrusion resistant. This is immersed in drive oil and compressed. In addition, a configuration in which six cube-shaped internal anvils made of cemented carbide are used for the sample in the eight-part spherical external anvil is often used. This configuration is called the Kawai type (or 8-6 type) cell. On the other hand, due to the structure of assembling the anvil in two stages, the working pressure of the segmented sphere type high-pressure cells is higher than that of the cubic type. Theoretically, the working pressure of the split sphere is said to reach 40 GPa or more. Clearly, higher pressures can be obtained more easily with the hydrostatic pressurization method. Therefore, this combination of hydrostatic pressurization and High-pressure cells lends itself to the production of larger size synthetic diamonds than the piston pressurization method. However, even with the conventional hydrostatic pressurization method, only one high-pressure cell can be treated at one time.

Non-Patent Document 2 describes the detailed structure and advantages/disadvantages of the split sphere device (BARS device) without the compression press. This apparatus consists of a hydrostatic pressurization device and the split-sphere type high-pressure cells. This device is used for research such as on the formation mechanism of minerals in the mantle at domestic universities. The BARS-type device of Non-Patent Document 2 is the Kawai cell (type 8-6) high-pressure cells consisting of eight steel external Anvils and six cubic tungsten carbide (WC) internal Anvils. There are several types of this internal anvil. The internal anvil has a spatial volume of 8 to 20 cubic centimeters (cm^3) to accommodate the processed material and internal heating source. The outer diameter of the external Anvil is 290 mm. The cubical internal Anvil has an outer height and width of 47 mm. The pressurization device employs a hydraulic pump that injects oil into a spherical container with the pressure-resistant shell. The maximum discharge pressure of this hydraulic pump is 250 MPa. One high-pressure cell is housed in one pressure shell. The outer surface of the split sphere rests gently on the rubber sheath that is firmly connected to the ends of the two steel hemispheres of the spherical container. The oil layer, which is the pressure medium, is filled only in a thin layer between the rubber sheath and the inner wall of the pressure-resistant spherical container, and the outer surface of the segmented sphere is isotropically pressurized via the rubber sheath.

Non-Patent Document 2 states that working pressure of 15.5 GPa was obtained with an oil pressure of 190 MPa of the hydraulic pump. The author claims that this is the compact device that does not require the large and expensive device such as the uniaxial compression press and does not have the inconvenience of being dirty with open oil. Here, the sheath is used for the same purpose as the fluid-proof rubber shell described above, and means a cover made of the plastic material such as resin or rubber that is in close contact with the outer surface of the high-pressure cells.

FIG. 1 shows the schematic diagram of the pressurization device and the high-pressure cells in the conventional hydrostatic pressurization method for academic research, published in Non-Patent Document 2. The codes of the system of this specification were added to FIG. 1.

The split-type high-pressure vessel 1 and the split frame 2 constitute the pressure-resistant shell spherical vessel. The external Anvil (divided into 8) 3 is installed inside thereof, and the internal Anvil (divided into 6) 4 is installed inside thereof. The rubber sheath is applied to the outside of the segmented spherical external Anvil 3. In the BARS-type device, the narrow area between the inner wall of the high-pressure vessel 1 and the rubber-sheathed external Anvil 3 is the area filled with the pressure medium 6. Two current and Instrumentation Lead 5 are provided on the upper container body and two on the lower container body. Inlet and outlet pipes are installed in the lower container body for the cooling water.

Non-Patent Document 2 shows a comparative experiment between an external uniaxial compression press and the device consisting of the split-sphere type high-pressure cells. This experiment is for the purpose of calibrating the working pressure. Therefore, the working pressure used in the experiment is suppressed to a low level of 5.5 to 7.5 GPa. Judging from this numerical value, the pressure of the pressure medium during the experiment is suppressed to a low level of about 70 to 100 MPa.

Further, in general, a slight change in volume of the liquid pressure medium causes a large change in pressure. Therefore, accurate pressure control in the high-pressure region is difficult. As shown in Non-Patent Document 3, in this pressure range, both the device and the instrument themselves elastically deform, and physical properties such as the density and viscosity of the pressure medium oil also change. Therefore, the pressure cannot be accurately measured by the pressure gauge. When the pressure medium is accompanied by temperature changes, pressure control becomes more difficult due to changes in density. Non-Patent Document 2 states that in the BARS-type device, the working pressure exceeded the desired value due to the heating of the pressure medium during operation, and gradually increased over time, and became uncontrollable.

As a countermeasure against uncontrolled pressure, the BARS apparatus was equipped with the internal cooling system with mesh channels. This circulates cooling water between the sides of the anvil near the heated high-pressure cells. This was expected to circulate cooling water to cool the High-pressure cells in order to suppress the pressure increase due to thermal expansion of the pressure medium. Tungsten carbide (WC), which has good thermal conductivity, was used for the internal anvil of the BARS device.

In Non-Patent Document 2, there is no explanation that the pressure of the pressure medium is measured and controlled. In the case of the structure of the BARS device, the layer of oil (pressure medium) between the inner wall of the spherical container, which is the pressure-resistant shell, and the high-pressure cells is thin, and the volume and mass of the oil are small. This is one of the factors that made control difficult. By cooling the High-pressure cells with cooling water, the device can indirectly suppress the pressure rise of the pressure medium. However, this method does not allow the pressure to be instrumented and accurately controlled.

While this may be acceptable for geological experiments, it poses a serious problem for commercial production of large diamonds with long growth times. The reason for this is that variations in process pressure over time make it difficult to control the product quality and pressure limits of the pressure hull of the equipment. Moreover, it becomes difficult to manage the durability including the high-pressure cells. In the commercial apparatus, the change in the pressure of the pressure medium must be grasped by means of measurement, etc., and the control mechanism must be introduced so that the pressure does not fluctuate greatly during the treatment after reaching the desired treatment pressure.

As noted above, the pressures and temperatures required for production were already discovered in the 1950s, and synthetic diamonds have been produced based on half a century of experience. Further, High-pressure cells are gradually progressing for the purpose of increasing particle size, improving quality, and improving yield. On the other hand, however, pressure devices have not made much progress. In the piston pressurization method, the 6-axis compression press (CCP) appeared, and the number of cylinders increased to 6-axis. Nevertheless, the CCP still uses the mechanical press cylinder. In order to strictly require uniform pressure, CCP can only produce one product at one time, even with the six-axis press. In addition, since an excessive force is applied to the anvil and the press piston mechanically, their lives are shortened due to breakage and creep deformation, and the wear frequency of these parts is further increased. On the other hand, in the hydrostatic pressurization method, the high-pressure cells have progressed by adopting the rubber sheath and a cooling system, but there is no conventional example in which the pressurization method has advanced.

In the past, as disclosed in Patent Document 1, the high-temperature and high-pressure processing apparatus has been devised with the aim of increasing the number of samples that can be processed at one time by using the belt-type device of piston pressurization. The device consisting of this belt-type mold unit is called the solid extra-high pressure press device. This machine is designed to improve productivity by arranging multiple stages of mold units on the center of the press axis.

At first glance, it seems possible to increase the number of samples that can be processed at one time by multi-stage processing using the belt-type apparatus. However, if the molds are arranged in series, even if only one mold unit is used, handling of all mold units is required. Moreover, even if one of the anvils, cylinders, etc. of the die unit is damaged, all work must be stopped. Therefore, in Patent Document 1, improvements were made in addition to existing ones. The improved method solves the above-mentioned problems by making the mold units completely independent instead of providing them in series. However, as for Patent Document 1 the belt-type mold unit is used for the high-pressure cells. That is, the piston pressurization method is not the hex-axial compression press. This method is the vertical uniaxial compression press with only one press piston.

As mentioned at the beginning, the disadvantage of the belt-type is that the pressure device becomes quite large. To manufacture a large diamond with a diameter of about 10 mm, even one belt-type high-pressure cell does not have enough compressive force of the uniaxial compression press.

Therefore, if two or more High-pressure cells are used in series or in parallel, obviously it becomes even more insufficient. This method cannot be used to produce synthetic diamonds as large as 10 mm in diameter. It should be noted that, at present, this multi-stage treatment solid state ultra-high-pressure apparatus has not been adopted even to produce small diamonds.

In principle, the number of products that can be processed under high pressure at one time is one by the hex-axial compression press which is the conventional piston pressurization method. In addition, due to the limitation of press capacity, the piston pressurization method cannot produce larger synthetic diamonds than the current situation. On the other hand, conventional hydrostatic pressurization BARS devices are not ready for commercial use. Furthermore, the number of split-sphere High-pressure cells that can be treated in the pressure-resistant shell spherical container is one at a time. In both cases, the number of products that can be manufactured in several days of operation is one.

In other words, the conventional system currently in use does not embody a method for mass-producing large synthetic diamonds having a diameter of about 10 mm. At least for high-quality synthetic diamonds with a diameter greater than 15 mm, there is no method of producing even small quantities. In all available manufacturing methods, the number of products that can be treated under high pressure at one time remains at one, and the problem is the low manufacturing efficiency.

PRIOR ART DOCUMENTS

Non-Patent Documents

[Non-Patent Document 1] Hitoshi Kakutani (Author), "Recent Trends in the Ultra High-pressure cells for Diamond Synthesis", Special Issue—Latest Trends in High-pressure cells Technology—From Laboratory to Production Site, Science and Technology of High Pressure, Vol. 19, No. 4, pp. 264-269 (2009)

[Non-Patent Document 2] Anton Shatskiy. et. al "Press less split-sphere apparatus equipped with scaled-up Kawai-cell for mineralogical studies at 10-20 GPa", American Mineralogist, Volume 96, pages 541-548, 2011

[Non-Patent Document 3] Hiroaki Kajikawa, "For Highly Reliable Pressure Measurement—From National Pressure Standards to On-Site Pressure Measurement—", Journal of the Japan Society for Precision Engineering, Vol. 83, No. 7, pp. 651-654 (2017)

[Non-Patent Document 4] Shinwa Kishi, "High Pressure Processing Apparatus for Food and Biotechnology Fields", R&D Kobe Steel Technical Report, Vol. 58, No. 2, pp. 24-27 (2008)

Patent Document

[Patent Document 1] JP S63-319039 A.
[Patent Document 2] JP 2017-070985 A.
[Patent Document 3] JP S61-124503 A.
[Patent Document 4] JP 2013-113538 A.
[Patent Document 5] JP 2021-004692 A.
[Patent Document 6] JP 7046342 B (Japanese Patent Application No. 2021-088277 gazette, reference number P210526-1 of an applications Filed on the Same Date).
[Patent Document 7] JP H11-42283 A gazette.

SUMMARY OF THE INVENTION

Problems to be Solved by the Invention

With the development of applications of synthetic diamonds, the demand for them will increase more and more in the future. In particular, large-sized products are in high industrial demand for semiconductor substrates and heat sinks as the integration rate of semiconductors increases, and also for various window materials, optical lenses, etc. However, with the current temperature difference method of the static pressure method, the temperature gradient must be small so that the growth time is long to produce a large synthetic diamond. Furthermore, the temperature and pressure must be regulated very carefully. Larger sizes require more time and effort. The problem to be solved by this invention is to implement a method for rationally producing large-sized synthetic diamonds. Also, in countries like Japan, electricity and labor costs are relatively high. From the viewpoint of international competitiveness, economy is a big issue. Conventional systems cannot economically produce large size synthetic diamonds. This is the problem.

In the case of either the piston pressurization method or the hydrostatic pressurization method currently in use, the above conventional system can process only one product at a time. Long growth times are required to produce large diamonds. As a result, one processing unit is exclusively occupied for several days. Therefore, low manufacturing efficiency makes the problem even more serious.

In the piston pressurization method, the recent hex-axial compression press increases the compression force to manufacture large diamonds of 15 mm or more. But even that has almost reached its limit. Also, each anvil of the hex-axial compression press must be proceeded synchronously in each piston and each hydraulic unit. Therefore, the hex-axial compression press is difficult to handle and has a problem of workability. Furthermore, the hex-axial compression press does not improve product quality or yield due to the non-uniformity of the compressive force of the hex-axial press cylinders. Moreover, the high-pressure cells require the isotropic compressive force to approximate the shape of a sphere. The uniaxial compressive force of the press cylinder should be directed to the isotropic direction as much as possible. As a result, an excessive force is applied to the anvil and the press piston, and the service life of these mechanical elements is shortened due to breakage and creep deformation. The problem is their high wear frequency.

On the other hand, the hydrostatic pressurization method can obtain a high compressive force, but the one reported so far is an experimental device for academic research. In its basic configuration, the high-pressure cells wrapped in the rubber sheath are immersed in oil as the pressure medium and hydrostatically pressurized. In addition, in this device, the pressure medium is heated during operation, and the pressure exceeds the desired value and gradually rises over time and becomes uncontrollable. In the conventional system, cooling water is circulated in the mesh pattern inside the high-pressure cells as a countermeasure. However, the pressurizing device does not have the function of controlling and stabilizing the pressure with high accuracy. In addition, accurate measurement of pressure near 1 GPa is generally not easy. However, in the commercial production of large diamonds, the contingent increase of operating pressure creates significant problems, such as product quality variability, exceeding the pressure limits of the pressure-resistant shell of the equipment, and the like. Also, these pose serious problems in terms of managing the durability of split-sphere devices.

The present invention solves almost all of the problems of the prior art described above. The purpose is to provide a production apparatus for producing synthetic diamonds of high quality and large size, which can be commercially stably operated.

More specifically, the object of this is to provide the manufacturing apparatus capable of efficiently manufacturing a plurality of large-sized synthetic diamonds with the single apparatus by simple operation and reducing the frequency of damage to the apparatus.

Means for Solving the Problem

The present inventor devised the following means for synthesizing high-quality, large diamonds of 10 mm or more in size by the static pressurization method among high-temperature and high-pressure methods (HPHT methods). That is, the volume change rate (compressibility) due to pressure and the volume change rate due to heat of the pressure medium that is liquid at normal temperature and pressure should be obtained. The isotropic hydrostatic pressurization method uses this liquid as the pressure medium. Multiple high-pressure cells are installed in the high-pressure vessel. By heating the pressure medium, the flow rate is controlled. Temperature is measured in parallel and used for control. By doing so, it has been found that high-temperature and high-pressure processing can be performed by controlling the pressure by volumetric expansion of the pressure medium.

In addition, the sealing material made of the heat-resistant elastic material that is resistant to vacuum pressure and fluid intrusion should be installed on the outer surface of the high-pressure cells. The inventor also designed the support mechanism for the high-pressure cells. As a result, it was found that this apparatus can simultaneously treat two or more High-pressure cells having different shapes in one high pressure vessel.

The present inventor has found the high-temperature and high-pressure apparatus capable of producing many products with the single high-temperature and high-pressure treatment by simply operating the compact apparatus with a low frequency of damage. In the following description, the heat-resistant elastic material sealing material described above will be referred to as the "seal of fluid-proof [heat-resistant] elastic material".

In the remainder of this description, Pressurization method means the method of isotropic hydrostatic pressurization unless otherwise specified. This isotropic hydrostatic pressure pressurization uses the pressure medium consisting of a fluid having known compressibility and volume change rate due to heating and having fluidity at normal temperature and normal pressure. Further, the high-pressure cell is a general term for an apparatus having processed material and the anvil of the type such as the above-mentioned cubic type or segmented sphere type. Furthermore, the anvil is a generic term for the above-described internal Anvil, external Anvil, split Anvil, and the like. However, when referring to the cubic type of high-pressure cells, the regular hexahedral type, the regular octahedral type, or those obtained by cutting all of the protruding end surfaces thereof into the plane are separately expressed. A product obtained by removing all projection end surfaces in a planar shape is hereinafter referred to as a "product with all tip portions removed".

In the hydrostatic pressurization method, the pressure medium compressed by the pressurizing mechanism is generally pushed into the high-pressure vessel to create a state of isotropic hydrostatic pressure (hereinafter referred to as "isotropic pressure"). The inside of the high-pressure vessel is in a state of isotropic pressure. The surface of the high-pressure cells is sealed with the seal of fluid-proof [heat-resistant] elastic material. After that, the high-pressure cells installed in the high-pressure vessel cause the isotropic pressure to act on the outer surface (pressure-receiving drive surface) of the high-pressure cells. As far as the shape and area of this pressure-receiving driving surface are the same, the compressive force generated inward from the outer surface receiving the isotropic pressure is essentially exactly the same. The area of the pressure drive surface equals the outer surface area of the split-spherical external Anvil in many cases. Therefore, there is no problem of handling difficulty or workability, which is the case with the hex-axial compression press.

In addition, variations in product quality originating from processing equipment are likewise eliminated. Moreover, since there is no press piston, it cannot be damaged. If the process pressure of the pressure medium is 700 MPa, working pressures up to 50 GPa or more are theoretically possible. In the case of the hydrostatic pressurization method, the processing pressure is about one order higher. This eliminates the need for the large external anvil as in the piston pressurization method. Also, the high-pressure cells become smaller.

In addition, the same isotropic pressure exists everywhere in the high-pressure vessel. Therefore, if the outer surface has the symmetrical shape in which the pressure received from all directions is the same, the same phenomenon as described above occurs regardless of the location and number of High-pressure cells of any shape. That is, as long as the dimensions and volume of the high-pressure vessel allow, many High-pressure cells can be installed in the high-pressure vessel and high-pressure treatment can be performed at the same time. Another object of the present invention is to facilitate pressure control of the pressure medium. As a result, installing two or more High-pressure cells in the same high-pressure vessel contributes to increasing the mass and volume of the pressure medium.

The shape of the high-pressure cells can be selected from all symmetrical shapes such as the regular hexahedron, the regular octahedron, or the cut-off product thereof, or the segmented sphere. Therefore, the hydrostatic pressurization method can easily increase the size of the device. Furthermore, the hydrostatic pressurization method can produce two or more products such as synthetic diamonds in one high-temperature and high-pressure treatment, improving production efficiency.

There exists the Cold Isostatic Pressurization (CIP) device based on the same principle of the hydrostatic pressurization method, as in Non-Patent Document 4. Currently, there are devices that utilize water as the pressure medium and pressurize with compressors and pressure multipliers. This pressure treatment apparatus has a pressure of 700 MPa and a volume of 14.7 cubic meters. The processing chamber of the high-pressure vessel has a diameter of 2,500 mm and a height of 3,000 mm. As of 2008, this device is in operation as a production facility. This pressure is more than six times the maximum total pressure of the hex-axial compression press described above. Unfortunately, the pressure medium and its temperature are not available in this CIP device specification. However, there exists currently the large-scale apparatus that can accommodate a considerably large-sized processed product in the high-pressure vessel and operate in the high-pressure region of the processing pressure of 700 MPa. Therefore, the hydrostatic pressurization method does not pose a scale problem in commercial industrial applications. These are the extent of the known facts.

By using the isotropic hydrostatic pressurization method, the entire high-pressure cell is also pressurized in the direction of contraction inward. At the same time, since the same compressive force acts on the anvils of the same shape and location within the high-pressure cell, no unreasonable force is applied in one direction other than that of the working pressure. In addition, the possibility of chipping or other damage occurring on the inner surface of the external Anvil or the like is significantly reduced. This eliminates the loss of compressive force and makes the device compact. At the same time, by eliminating non-uniformity in compression force, product quality and yield can be improved.

On the other hand, as described in the above "Background of the invention", it is not easy to artificially control the pressure rise accompanying the temperature rise of the pressure medium, which is a problem in the conventional hydrostatic pressurization method.

In the present invention, two or more high-pressure cells are installed in the same high-pressure vessel to increase the mass and volume of the pressure medium. Furthermore, the pressure medium is used with known compression ratio and temperature dependence. The following mechanisms are installed in the high-pressure vessel. This is the mechanism that measures and manages the temperature of the pressure medium and actively increases or decreases the temperature of the pressure medium without changing the space volume in the high-pressure vessel or the mass or volume of the pressure medium. That is, after controlling the flow of the pressure medium in the high-pressure vessel, the temperature of the pressure medium is measured, managed, and controlled, and the pressure of the pressure medium is controlled by the expansion of the pressure medium. Thereby, the processing pressure can be managed with high accuracy.

If there is no fluid with known compressibility and its temperature dependence, properties of the pressure medium are measured. That is, the commercially available diamond anvil cell high-pressure device (DAC) and a pressure calibration device will be connected to the actual gate valve of the high-temperature and high-pressure treatment device to acquire the necessary physical property data of the pressure medium. This should be done before the actual processing. The temperature should be between room temperature and maximum operating temperature. Pressure is used between normal pressure and the maximum allowable pressure of the device. The maximum operating temperature is, for example, 250° C. The maximum allowable pressure is 1 GPa, for example.

Furthermore, the calibrating device may be the calibrated secondary standard as described in Non-Patent Document 3 instead of the primary standard. There is also an example in which the DAC is used at a pressure of 1 GPa or higher.

In addition, even higher working pressures need to be obtained to produce large size synthetic diamonds. In the previous section, pressure control of a fluid whose volume change rate due to temperature is known was explained. Here, a fluid whose volume is clearly expanded by heating should be used. In the high-pressure cells, although the volume is small, the processed material is heated to the high-temperature range of 1300° C. or higher by the internal heating source. Through the structure such as the anvil in the high-pressure cells, the heat is transferred to the large volume of pressure medium in the high-pressure vessel, which inevitably raises the temperature of the pressure medium. If the pressure medium, which is a fluid with a predetermined numerical value that expands into relatively large volume due to heating in a range from room temperature to, for example, 250° C., is used, the pressure of the pressure medium in the high-pressure vessel increases as the volume expands. Example 2, which will be described later, shows examples of pressure medium types, physical properties, viscosities, compression ratios, and expansion ratios that meet these requirements. The volume of the pressure medium decreases slightly according to the compressibility corresponding to the increase in pressure, but if the pressure medium whose volume expansion due to heating is superior (e.g., other than water) is used, the effect is limited.

That is, in the configuration of the present invention, by further developing and utilizing the volume expansion effect accompanying heating of the pressure medium, the process can be continued while maintaining the pressure of the pressure medium without additional pressurization operation by the pressurizing mechanism. Moreover, higher working pressures can be obtained. Alternatively, the process can be continued while maintaining the pressure of the pressure medium even after the pressurizing mechanism stops. Further, in the configuration of the present invention, by providing the heating mechanism such as a pressure-resistant heater for increasing the temperature of the pressure medium in the high-pressure vessel, high-temperature and high-pressure processing can be continued. Furthermore, not only higher working pressures can be obtained, but also the high-temperature and high-pressure treatment can be continued at that pressure. This working pressure cannot be reached with the pressurizing mechanism. Furthermore, the pressure can be precisely controlled by the above method.

Patent Document 3 describes the configuration in which the hydraulic medium heating device is provided outside the high-pressure vessel, and the pressure medium is inserted into the high-pressure vessel by the hydraulic medium supply/discharge means. However, the present invention refers to pressurizing to a higher region by heating the pressure medium in the high-pressure vessel than the stage where the pressure medium has already reached a certain high pressure by the pressurizing mechanism. Since the amount of pressurized medium supplied is extremely small at the stage of reaching a certain high pressure, the configuration in which the pressurized medium is heated outside the high-pressure vessel in Patent Document 3 does not produce the effects referred to by the present invention.

The volume of the pressure medium expands due to the heat transfer from the internal heating source inside the high-pressure vessel and the active heating by the heating mechanism inside the high-pressure vessel described in the previous section. As a result, the pressure in the high-pressure vessel becomes higher than the pressure in the pressurizing mechanism after a certain period has passed since the start of the treatment. In the configuration of the present invention, the check valve is provided that operates in the direction of closing the piping path when the pressure of the pressure medium in the high-pressure vessel becomes higher than that in the pressurizing mechanism.

If the check valve closes the piping path, no additional pressure medium is added even if the pressurizing mechanism is in operation. Also, at this time, the pressurizing mechanism may be stopped. The pressure and temperature of the pressure medium at this point and its mass must be recorded. This may be used as a reference condition or origin for pressure control based on temperature measurement as described in the previous section.

Further, even when the drive is stopped or reduced, the piping path from the pressurizing mechanism to the high-pressure vessel can be removed on the pressurizing mechanism side of the check valve. This means that high-temperature and high-pressure processing can be continued even if the pressurizing mechanism is stopped or separated from the pressurizing mechanism. That is, after the pressurizing mechanism that has finished pressurizing the pressure medium in one high-pressure vessel completes its role in the initial stage of pressurizing the pressure medium to the certain pressure, it can connect the removed piping path to another high-pressure vessel. This makes it possible to start the pressurization of the pressure medium in another high-pressure vessel.

Among the devices that constitute the hydrostatic pressurization method, the pressurization mechanism is the dominant device in terms of size and cost. Therefore, being able to share one fluid pressurizing mechanism for a plurality of high-pressure vessels is very effective in making the processing apparatus compact and streamlined.

That is, by further developing and utilizing the thermal expansion due to the temperature rise of the pressure medium, a higher working pressure can be obtained without pressurizing the pressure medium by the pressurizing mechanism. At the same time, one pressurizing mechanism such as the high-pressure compressor can be shared by a plurality of high-pressure vessels, making the apparatus even more compact.

Also, as mentioned in the "Background of the invention" section above, the duration of the high temperature and high-pressure treatment is much longer than several days to produce larger size synthetic diamonds. Therefore, the non-use (absence) time of the pressurizing mechanism, which is used only at the time of initial start-up, becomes longer. The effects of the present invention that can be obtained by allowing a plurality of high-pressure vessels to share the single pressurizing mechanism are as follows: First, it allows compact processing equipment to produce large quantities of large-sized synthetic diamonds in multiple high-pressure vessels. Second, equipment such as high-pressure pumps can be streamlined. Furthermore, the installation area of the entire equipment can be reduced, which has a great effect in economically rationalizing the manufacturing process itself.

Patent Document 4 discloses the switching valve for switching between the high-pressure compression line and the low-pressure compression line to use two hydraulic pumps with different capacities. However, this differs from the idea of using one pressurizing mechanism shared by a plurality of high-pressure vessels of the present invention, and the configuration of flow paths and equipment is also different. Therefore, the configuration and concept of the switching valve of Patent Document 4 do not have the effects referred to by the present invention. In addition, Patent Document 5 discloses two structures between the storage space in the inner storage container containing hot water preheated to 100° C. or less and the processed material and the outer processing space filled with the pressure medium. This structure is the container for the CIP device with two independent flow paths and two check valves. This is for shortening the heating time when high-pressure sterilization of food is performed using water as the pressure medium in the temperature range of 100° C. or lower, and for quickly carrying in and out the processed material. The configuration and purpose are different from the present invention. In addition, the temperature conditions of the present invention are also in the higher temperature range. Moreover, this invention obtains high pressure by heating the pressure medium in the high-pressure vessel during the several days of treatment operation. The configuration of Patent Document 5 is different from this present invention.

Here, in the state of pressurizing the pressure medium using the heat transfer from the internal heating source to the pressure medium described in (0028), the method in which labor in the work can be saved and the work time can be shortened is proposed. In general, in the production of synthetic diamond under high temperature and high-pressure conditions, operation is performed in the pressurization precedence type in which the pressurization operation precedes the temperature raising operation. Since a fluid having a low compressibility due to pressure is used as the pressure medium, the pressurizing operation by the pressurizing mechanism is completed in a short time.

The operation of removing the piping of the pressurizing mechanism takes a certain amount of time. The reasonable operation would be not to require time to disconnect the tubing. During this time, the temperature of the processed material can be increased, and the pressure of the pressure medium can be further increased.

To use this time effectively, various things should be changed. By changing the material of the anvil in the high-pressure cells to the type of super hard material with different thermal conductivity as in Example 8 below, the heat transfer from the internal heating source to the pressure medium will be varied. Thereby, the pressurization speed of the pressure medium in the high-pressure vessel in the initial stage can be changed. As the temperature of the processed material is increased, the pressure medium can increase the pressure within an appropriate range. Also, the steady-state pressure of the pressure medium can be set to the desired value. The required pressure of the pressure medium and its pressure increase speed vary depending on the size of the synthetic diamond to be manufactured. However, by selecting the type of ultra-hard material for the anvil, it is possible to control the pressurizing speed of the pressure medium accompanying heating from the internal heating source to conditions appropriate for the size. As a result, the working time can be shortened.

At room temperature, as is generally known, the viscosity of the liquid under high pressure increases, so the pressure medium in the high-pressure vessel does not flow much. Therefore, the pressure in the high-pressure vessel is uniform due to the hydrostatic pressure, but the temperature is considered to be unevenly distributed. On the other hand, it is generally known that the viscosity of liquids decreases inversely with temperature. The preferred pressure medium according to the invention is the organic solvent. As shown in Example 2 below, the viscosity of the pressure medium at the pressure of 500 MPa and the temperature of 250° C. is approximately the same as that of water at normal pressure at room temperature. This is the result of subtracting their compression delta and heating delta. Therefore, flow due to thermal convection occurs sufficiently in the high-pressure vessel.

The invention further develops flow by thermal convection. This phenomenon means the natural convection (thermosiphon) caused by the difference in density due to heat, by appropriately arranging the heating mechanism and the cooling mechanism in the high-pressure vessel and installing the partition plate in the pressure medium. There are two types of heating sources: the internal heating source of the high-pressure cells arranged on the central axis of the high-pressure vessel and the pressure medium heating heater of the heating mechanism installed at the bottom. In addition, the cooling jacket of the temperature decrease mechanism is arranged on the outer upper portion of the high-pressure vessel. Therefore, by heating the lower end and the center of the central portion of the high-pressure vessel and cooling the upper half of the outer wall, the fluid heated in the central portion rises and the fluid cooled in the outer wall portion descends. This forms the thermosiphon.

The temperature measurement points are determined at the highest and lowest temperature points determined by the thermosiphon. Measuring points are placed at TC1 (highest temperature) and TC2 (lowest temperature). Thereby, the temperature that can be used for temperature control such as operation at the time of start-up is measured. A metal plate for averaging the temperature of the pressure medium is installed on the partition plate (support plate), and the measurement point TC3 (average temperature) is installed at that position. This measures the temperature available for temperature control of steady state operation. The details of the temperature reducing mechanism of the pressure medium, the heating mechanism in the high-pressure vessel, the temperature measurement point, and the thermosiphon structure are shown in Example 5 below.

Now, the outer surface of the high-pressure cells has the symmetrical shape, but the external Anvil, such as a regular hexahedron or the split sphere, is exposed. If the surface remains in this state, the pressure medium will fill the interior. As a result, the working pressure cannot be applied to the processed material by hydrostatic pressurization. Therefore, the outer surface of the high-pressure cells is generally provided with the seal capable of preventing penetration of the pressure medium (having fluid penetration resistance), such as the rubber shell or rubber sheath described above.

The shape of this seal has existing prior art. First, there is the thick seal that fits the upper and lower molds together at the fitting portion. The fitting portion has a narrow width but the large thickness. Next, there is the highly elastic bag-shaped mask-like thin seal. This is made by double stacking two sheets with the wide width of the area of the fitting part.

Moreover, to prevent voids from remaining in the product due to residual air, the inside of the high-pressure cells is generally evacuated before the high-temperature and high-pressure treatment. For this reason, the seal having strength to withstand the atmospheric pressure when evacuated (vacuum pressure resistance) is applied. The materials and shapes of these rubber shells and rubber sheaths are within the range of known facts.

Due to the high temperature of the high-pressure cells of the present invention, conventional rubber shells and rubber sheaths cannot be used. Here, seals and molds made of fluid-proof [heat-resistant]elastic material as shown in Example 3 below are used. The “fluid-proof [heat-resistant] elastic material” is also called the “heat- and fluid-resistant elastic material”.

In the previous section, the case where the high-pressure cells, whose outer surface is sealed with the heat- and fluid-resistant elastic material, is in contact with the pressure medium was explained. In the following this is referred to as “pressure medium contact” or “wet process”. In the liquid medium pressurized high-temperature/high-pressure treatment apparatus for wet treatment of the present invention, the outer surfaces of the plurality of High-pressure cells are sealed with the heat- and fluid-resistant elastic material. Subsequently, the high-pressure cells are suspended from the lid of the high-pressure vessel by the securing mechanism and immersed in the pressure medium.

However, in the handling of the pressure medium contact type (wet process) high-pressure cells for high temperature and high-pressure treatment, the presence of the seal immersed in the pressure medium such as drive oil complicates the work and makes it difficult. In particular, the procedure for handling oil-smeared High-pressure cells and the like by decontamination etc. complicates the work and makes it extremely difficult. Non-Patent Document 1 states that this is the reason why it has not gone beyond the realm of academic research and has not become the commercial device. Non-Patent Document 2 states that although an oil-free system has been developed for one segmented sphere type high-pressure cells, pressure control is not possible.

The high-temperature and high-pressure treatment method for efficient mass production is not limited to the above-described conventional technology, and two or more products must be produced in one treatment. The configuration must then be devised in which the outer surface of the high-pressure cells or its fluid-proof [heat-resistant] elastic seal does not meet the pressure medium. In the following, this arrangement is referred to as “pressure medium non-contact” or “dry process”.

Patent document 2 and non-patent document 4 show the pressure medium non-contact type high pressure treatment method at room temperature for powder pre-compression in the ceramics field and for pressure treatment of packed products in the food hygiene field. Both are called the dry methods or the dry CIP devices. For powder pre-compression, the powder is pre-compressed by filling it into the pressurized rubber mold, which is the cylindrical natural rubber molding mold connected to the high-pressure vessel. The pressurized rubber mold is cylindrical and can be pressurized in the circumferential direction, but not in the axial direction. Patent Document 2 describes that a plurality of pressurized rubber molds is connected to obtain a plurality of products in one treatment. In addition, Non-Patent Document 4 shows an example in which many packed products are stored in the flexible holder at the preparation station for packed product pressure treatment. It is stated that this allows these few holders to be transported into the treatment chamber to pressurize the fairly large number of packed products simultaneously. In these methods, since the outer surface of the product does not meet the pressure medium, there is no possibility that the pressure medium will enter the product and contaminate it. Accordingly, sanitary safety is high. In addition, there is no need for the drying process after treatment, which is effective in simplifying the process. Therefore, in the normal temperature range, multiple products can be subjected to high pressure treatment at the same time by connecting multiple powder pressurized rubber molds or by storing small and light packed products in the flexible holder. This method is the extent of known facts.

In the case of the pressure medium non-contact type (dry process) liquid medium pressurized high temperature and high-pressure processing apparatus of the present invention, the surface temperature of the high-pressure cells is, for example, about 250° C. Its outline is completely symmetrical. In addition, the mass of one high-pressure cells is several tens of kilograms or more, and most of them are made of metal. Heavy High-pressure cells can weigh several tons. This is a heavy object. In addition, hydrostatic pressure must be applied to the entire surface despite the high temperature, symmetrical shape, and heavy weight. Therefore, it cannot be installed in a state in which the entire outer surface in one direction is in contact with the floor or side surface of the high-pressure vessel. Since the process is performed in such a situation, the configuration differs from that of the prior art described in the previous section. Unlike the prior art, the dry process of the present invention does not allow multiple connection of pressurized rubber molds or housing the large number of processed materials in the flexible holder. At least, the material with added heat resistance must be used for the pressurized rubber mold in the preceding paragraph. On top of that, the structure must realize the method of isotropically pressurizing the processed material precisely with uniform pressure without directionality. In addition, the support mechanism is required to support the load of the high-pressure cell, which is a heavy object.

The seal of fluid-proof [heat-resistant] elastic material used in pressure medium non-contact type (dry process) liquid medium pressurized high-temperature and high-pressure treatment equipment must be heat-resistant rubber, resin, or the like. The required heat resistance is, for example, the temperature in the 250° C. region. Further, when the high-pressure cell is accommodated, the molding mold (hereinafter referred to as “mold”) must be able to follow its external shape from all directions. Although there is the difference in the presence or absence of heat resistance in the material of the seal, the basic configuration of the mold is as described in detail in Patent Document 6, which was filed separately.

The mold is one pair of a fluid resistant elastic lid and a container body. This is because the upper molding die and the lower molding die are fitted together at their lower and upper portions. The molding mold that is fixed to the main part of high-Pressure vessel (hereinafter referred to as “body”) and surrounds the outer peripheral surface normal direction and the lower surface axial direction is called “the lower mold” (lower mold for short). The molding mold that is fixed to the lower surface of the lid of high-pressure Vessel (hereinafter referred to as “lid”) and covers the upper surface in the axial direction is called “the upper mold” (upper mold for short). The upper and lower molds are a pair of elastic material molds that fit together at the bottom and top. Also, the contact portion is processed into a shape that follows the outer shape of the high-pressure cell. The lower mold has the bottomed cylindrical shape with an opening at the top, and the recess accommodates the high-pressure cell. The upper mold is the hollow cylindrical or split-type container containing the pressure medium. It fits into the recess in the lower mold. As described in Patent Document 6, to perform hydrostatic pressure pressurization capable of precisely compressing from all directions without directionality in the above dry process, the following is required. That is, the first step is to remotely position the high-pressure cell, the lower mold, and the upper mold, which are present in invisible positions in both molds. The second step is to bond them snugly without wrinkling. The third step is to fill the upper mold with pressure medium without air bubbles or voids. In the fourth step, the entire inner surface of the upper mold and the entire outer surface of the lower mold are simultaneously hydrostatically pressurized. The configuration of Patent Document 6 is limited to the normal temperature range. However, the method of isotropically pressurizing the high-pressure cell precisely with uniform pressure without directionality is realized.

In the present invention, the following functions are added to the function of the mold for the fluid-resistant elastic material of Patent Document 6. First, use the heat-resistant material described above. Furthermore, the support mechanism to hold the weight of the high-pressure cells, the heat-resistant penetrating tube, and the folded-type vacuum exhaust port are applied. The support mechanism for the high-pressure cells having a large mass will be described later. Refer to Patent Document 6 for details of the structure and operation procedure of the upper and lower molds and the gravity equation pressure-medium equalizing tank.

In the case of the dry type high-temperature and high-pressure processing apparatus in which the high-pressure vessel is placed horizontally, the lower molding die of the heat- and fluid-resistant elastic material is fixed to the high-pressure cylinder. The fixed position is near the lid opening above the barrel. The pressure medium fills the space below the lower mold (in the direction of gravity) in the body of the high-pressure vessel. The lower mold is an open top cylinder, conforming in shape to the high-pressure cell. There is the floor at the bottom of the lower mold. The lower mold has an opening at the top for loading and unloading. As a result, its shape will become like a bottomed spout well.

As described above, the high-pressure cell is accommodated in the recess of the lower mold. The shape of the lower mold need not be a close match. Considering the elasticity of the material, the diameter of the recess should be slightly smaller. After installing the high-pressure cell, as the lid of the high-pressure vessel is lowered, the upper mold fixedly attached to the lower part of the lid is inserted, and the upper opening of the recess of the lower mold is closed.

The pressure medium inside the upper mold is in liquid communication with the lower mold. At the same time, hydrostatic pressure is applied. Therefore, both the upper and lower molds apply precise and uniform pressure to the high-pressure cell.

In the case of the pressure medium non-contact type (dry process), the upper and lower parts form one pair of molds, and the high-pressure cell is placed between them. Either the lower mold or the upper mold should cover the outer surface of the high-pressure cell. This covers all the outer surface of the high-pressure cell. Further, wrinkles in the mold are not preferable because they cause damage. Furthermore, if air remains in the mold, the compression of the air will affect the quality of the product, which is not desirable.

The heat- and fluid-resistant elastic material upper mold fixed to the lower part of the lid of the high-pressure vessel is the vessel that contains the pressure medium. The pressure medium is accommodated in the upper mold vertically divided into 2 to 4 parts at the inside of one high-pressure vessel. It can also be the one-piece hollow cylinder. The outer contour of the upper mold follows the upper half of the high-pressure cell and the concave inner contour of the open cylindrical lower mold. Its outer diameter should be smaller than the inner diameter of the lower molding die by several millimeters. Also, the length dimension should be on the order of only a few centimeters (eg, 6 centimeters (cm) or less) larger than the required length for the close match. Furthermore, the tapered guide mechanism based on the JIS B6101 7/24 taper structure is provided only below the center position in the height direction of the upper molding die. The width of the notching at the lower end of the upper molding die, which functions as the guide mechanism, is several centimeters. For example, its dimension is 5.3 cm or less. Also, by using the plastic material, it may be slightly deformed by high temperature or high pressure.

Prior to treatment, the upper mold is filled with pressure medium at atmospheric pressure to fit the high-pressure cell into the recess of the lower mold. Further, since the molding die is made of the heat- and fluid-resistant elastic material, the upper molding die is slightly stretched and deformed by the weight of the pressure medium and is suspended from the lid of the high-pressure vessel. In the process of lowering the lid of the high-pressure vessel in this state, the upper molding die is positioned by the guide mechanism described above. (First step). Immediately before joining the lid to the body, the lowering of the lid is temporarily stopped and the atmosphere in the space between the upper and lower molds is evacuated to vacuum. This allows the mold to fit snugly without wrinkling. (Second step). In this state, the pressure medium is filled from the upper gravity equation pressure-medium equalizing tank into the upper mold without air bubbles or voids. (Third step). Furthermore, the lid of the high-pressure vessel is joined to the body, and at the same time, the lower molding die and the upper molding die are fitted together. The high-pressure cell is now installed inside the mold. At this time, excess pressure medium squeezed out is collected in the gravity equation pressure-medium equalizing tank.

The upper mold is one-piece hollow cylindrical or longitudinally divided vessel containing the pressure medium. The heat-resistant penetrating tube and the vacuum outlet are installed in the central cylindrical part. Power supply/instrumentation cables and atmospheric escape pipe pass through here. In addition, cooling water pipes are allowed to pass through as necessary. This ensures the space for evacuating the atmosphere to the vacuum state. In addition, since the heat-resistant penetrating tube maintains its shape without deformation even during high-temperature and high-pressure treatment, the thermocouple, the fiber scope, or the like may be installed inside.

The heat-resistant penetrating tube penetrates the central cylindrical portion of the upper molding die and has heat resistance suitable for the working temperature of the pressure medium. Here, the power supply/measurement lead wires and the air release tube are housed inside. In addition, the cooling water piping (inlet/outlet) and the like of the high-pressure cell is accommodated as necessary. Therefore, the penetrating tube has the material and structure that can maintain its shape even under the pressure of the pressure medium due to its inherent strength. The penetrating tube is required to be made of heat-resistant material and to have considerable pressure resistance. Therefore, thick pipes are made of metal, ceramic, or heat-resistant engineering plastic. This tube improves its compressive strength and its repeated durability. In order for that, after the lead wires and pipes are housed, the internal space of the hollow tube is filled with metal powder or the like.

When vacuuming before high-temperature and high-pressure processing, an air flow path (hereinafter referred to as "vacuum exhaust port") is secured. The vacuum exhaust port is used at room temperature and at the pressure in the vicinity of vacuum to normal pressure. Therefore, the evacuation port has the larger diameter than the heat-resistant penetrating tube passing through the upper mold. Its diameter should preferably be as large a cross-sectional area as possible. However, if the diameter is too large, it affects the function of the upper mold, that is, the uniformity of the hydrostatic pressurization. Therefore, the exhaust port is preferably folded and closed during high-temperature and high-pressure processing after vacuum suction. Hereinafter, the vacuum exhaust port with this folding function is referred to as the folded-type vacuum exhaust port.

The folded-type vacuum exhaust port is the large-diameter tube located outside the heat-resistant penetrating tube described in the previous section. However, during high-temperature and high-pressure processing, the exhaust pipe is folded by the upper mold supplied with pressure medium and subjected to hydrostatic pressure. This exhaust pipe should be allowed to pass the atmosphere only before the high-temperature and high-pressure treatment. Therefore, this vacuum exhaust pipe is made of the elastic material, or the pipe itself is the penetrating tube such as the spring. That is, the vacuum exhaust port is the penetration pipe that is folded and crushed during high-temperature and high-pressure processing. In any case, the maximum strength of the folded-type vacuum exhaust port itself must be the vacuum pressure (atmospheric pressure). Penetration tubes made of stretchable material include tubes made of heat-resistant resin made of flexible material (also called microplastic material), such as the “penetration stretchable tube” of Patent Document 6.

In addition, as in Patent Document 7 and Example 4, which will be described later, a penetrating tube with a spring may have the structure like that of the “medical stent.”.

The lower mold has a certain amount of stretchability but should generally conform to the contour of the high-pressure cell. Also, the lower mold should not wrinkle when the high-pressure cell is gently installed. Furthermore, the lower mold must have the structure that does not impede the flow of the pressure medium on the outside while supporting the weight of the high-pressure cell of 10 kg or more. For this reason, the support mechanism must have, in the direction of gravity, the mesh-like or porous flow layer of the pressure medium that conforms to the contour of the high-pressure cell. Each shaped high-pressure cell is gently installed in a process pit with the uniquely shaped support mechanism. The horizontally placed high-pressure vessel is easier to handle, but the vertically placed one is also acceptable. By providing two or more treatment pits in the high-pressure vessel, this device can perform high-temperature and high-pressure treatment of two or more High-pressure cells in one treatment.

The shape of the high-pressure cells that can be used in the hydrostatic pressurization method in the case of the pressure medium non-contact type (dry process) includes symmetrical shapes such as the regular hexahedron, the regular octahedron, and the segmented sphere. Either shape can be used. However, for each processing pit of the high-pressure cells of each shape, one pair of molds having the specific shape and the supporting mechanism must be prepared in advance. Therefore, the shape of the high-pressure cells during dry processing cannot be chosen completely arbitrarily and should be planned in advance to some extent.

On the other hand, especially when the shape of the high-pressure cells is the regular hexahedron or the regular octahedron with protrusions, all the protrusion end surfaces should be uniformly cut in the flat shape to form the product with all tip parts removed. The reason is to prevent the high-temperature high-pressure cells from damaging the lower and upper molds. In the case of the segmented sphere type, since there are no projections on the surface, this kind of consideration is unnecessary.

The above (0034 to 0044) of the present invention described the high-temperature and high-pressure processing apparatus capable of dry process of two or more High-pressure cells in one processing. That is, to manufacture two or more products in one treatment by the pressure medium non-contact type (dry process), the lower mold and the upper mold of the heat- and fluid-resistant elastic material are provided. Then, the high-pressure cells are sandwiched and contained between them. The support mechanism for two or more High-pressure cells has the mesh-like or porous medium flow layer matching the shape of the outside of the High-pressure cells and is provided outside in the direction of gravity. The entire inner surface of the upper mold and the entire outer surface of the lower mold are simultaneously hydrostatically pressurized without directivity. As a result, the processed material can be subjected to high-temperature and high-pressure treatment with precisely uniform pressure. The processing apparatus as described above has been devised.

Effect of the Invention

The present invention solves the conventional problems described above. That is, by using the isotropic pressure by the hydrostatic pressurization method, the size of the apparatus can be increased. The single high temperature and high-pressure treatment can yield many large size synthetic diamond products with a diameter of 10 mm or more, 15 mm or more, or even 30 mm or more. Furthermore, since the frequency of damage to the device is reduced, the manufacturing efficiency can be increased.

Furthermore, the method was devised to control the flow of the pressure medium in the high-pressure vessel using the pressure medium with known compressibility and thermal volume change rate. In addition, the method of measuring, managing, and controlling the temperature of the pressure medium and a method of controlling the pressure of the pressure medium by expansion of the pressure medium were devised.

As a further development, the method was devised that uses the pressure medium that accompanies thermal expansion, installs the heating mechanism in the high-pressure vessel, and pressurizes using thermal expansion. As a result, a pressure exceeding the capacity of the pressurizing mechanism can be obtained, and a synthetic diamond of the larger size can be obtained. By further developing this, one pressurizing mechanism can be shared by a plurality of high-pressure vessels by using the piping route provided with the check valve. Moreover, by adopting the dry process in which the pressure medium and the high-pressure cells do not meet each other, the labor for decontamination of the pressure medium can be eliminated, and the work efficiency can be dramatically improved.

The compact processing apparatus capable of simultaneously producing a large number of large-sized synthetic diamonds by using a plurality of High-pressure cells and a plurality of high-pressure vessels is realized, and its work efficiency is improved.

With these, it is possible to realize the high-temperature, high-pressure manufacturing apparatus using the hydrostatic pressurization method for efficiently mass-producing large-sized synthetic diamonds. Therefore, it can make a great contribution to the utilization of the technology in the industrial field.

BRIEF DESCRIPTION OF THE DRAWINGS

FIGS. 3A and 3B a schematic diagram of the high-temperature and high-pressure processing apparatus using liquid medium hydrostatic pressurization of the pressure medium non-contact type (dry process).

MODE FOR CARRYING OUT THE INVENTION

Here, as a mode for carrying out the present invention, the following items of the high-temperature and high-pressure processing apparatus using the liquid medium hydrostatic pressurization method will be described with reference to the drawings. 1) is an overview of the structure of the pressure medium contact type (wet process). 2) is the structure of pressure medium non-contact type (dry process) and its mold structure and operation procedure. In addition, the common points of the above two will be explained in detail as follows. 3) is the processing equipment in which one pressurizing mechanism is shared by multiple high-pressure vessels. 4) is the structure in which the pressure medium is circulated by the thermosiphon in the high-pressure vessel. It should be noted that FIGS. 2-9 are merely examples and are not intended to limit the present invention.

Figure 2:
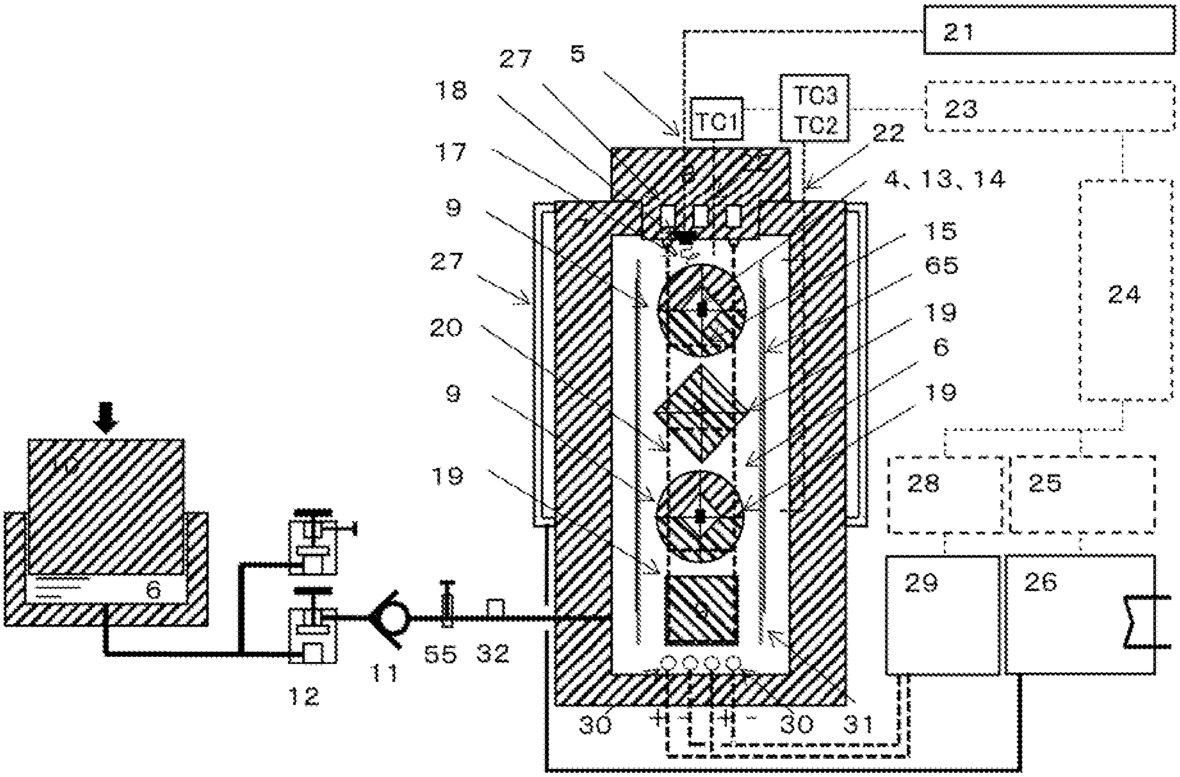
FIG. 2 shows the configuration flow of the high-temperature and high-pressure processing apparatus (pressure medium contact type: wet process) using liquid medium hydrostatic pressurization.

FIG. 2 is the configuration flow of the high-temperature and high-pressure processing apparatus (pressure medium contact type: wet process) using liquid medium hydrostatic pressurization according to the present invention. This schematically shows an example of the configuration.

In this processing apparatus, the closed space surrounded by the high-pressure vessel body 7 and the lid 8 is filled with the liquid pressure medium 6, and two or more High-pressure cells 9 are installed therein. The high-pressure cells 9 have symmetrical shape of a regular hexahedron or a regular octahedron. Or these High-pressure cells are of the type in which all these protruding end faces are cut flat. Alternatively, the high-pressure cells are of the split-sphere type. In the case of the pressure medium contact type (wet process), the outer surfaces of all the High-pressure cells 9 are covered with seals 19 made of the heat- and fluid-resistant elastic material, so that the pressure solvent does not enter. Their interior is evacuated prior to installation in this processing equipment. The pressure medium in the closed space surrounded by the body 7 and the lid 8 of the high-pressure vessel is connected to the pressurizing mechanism 10 through the piping line. The fluid having a known compressibility due to pressure and a coefficient of volume change or volume expansion due to temperature and having a maximum specification temperature of 250° C. or more is used as the pressure medium. The check valve 11 and the gate valve 12 are installed in the middle of the pipeline.

The liquid pressure medium 6 in the closed space is pressurized by the pressurizing mechanism 10 at the beginning of the treatment. This pressure (for example, 500 MPa) is the value that can be achieved by the inherent performance of the pressurizing mechanism 10 at room temperature.

On the other hand, in the high-pressure cells 9, processed material 13, the internal heating source 14, and the anvil 15 are installed in this order from the inside. The mass of each high-pressure cells 9 weighs over 10 kilograms (Kg). A power line for the internal heating source 14 is connected to the waterproof pressure connector 18 in the high-pressure vessel protruding from the outer surface of the high-pressure cells 9. The same applies to the connection cable 17 such as the measurement line of the internal thermocouple 16 for measuring the temperature of the processed material 13.

The plurality of High-pressure cells 9 is also fixed or suspended within the high-pressure vessel by the binding mechanism 20 so that all outer surfaces do not directly contact the inner wall of the high-pressure vessel. The maximum operating pressure of this device is the designed compressive strength of the high-pressure vessel. In recent years, there are also high-pressure devices with the pressure of several GPa. Also, the maximum temperature of the device is determined by the maximum operating temperature of the seal. At this temperature, the heat- and fluid-resistant elastic material does not deform significantly.

The high-pressure vessel 7 may be either vertical or horizontally placed. Further, the pressurized mechanism 10 may be the motor-type pump or the piston-type pump. Furthermore, although FIG. 2 shows three types and four pieces of High-pressure cells, there are no restrictions on the type and number of High-pressure cells as long as they are two or more.

Here, the operation following pressurization of the pressure medium by the pressurizing mechanism 10 will be described. In FIG. 2, the internal heat source 12 connected to source power supply of the internal heating 21 is heated. Next, the processed material 13 is heated to 1300° C. or higher. Over time, heat conduction heats the pressure medium 6 to the predetermined temperature (eg 150° C.). When the pressure medium 6 is heated, its pressure fluctuates due to the volume change caused by the temperature. The temperature change of the pressure medium 6 is detected by the high-pressure vessel thermocouple 22. The thermocouple 22 is installed in an exposed state on the inner surface of the high-pressure vessel. Also, the change in temperature is monitored by the temperature detecting function 23. The high-pressure vessel thermocouple 22 is classified into three types: TC1 (highest point), TC2 (lowest point), and TC3 (average point). TC3 is used to measure steady state average temperature. TC1 for the maximum temperature and TC2 for the minimum temperature are used for temperature control during start-up, rapid heating, and cooling. If the compressibility and volume change rate of the pressure medium are unknown, data are acquired. The DAC device and the calibration device may be connected to the gate valve 12 in the processing apparatus to acquire these physical property data before actual processing.

Here, the case where the temperature rises of the pressure medium 6 causes the pressure rise due to the change in volume to exceed the set value will be described. Upon receiving the signal from the temperature detecting function 23, the pressure regulation function 24 determines that the pressure of the pressure medium 6 should be reduced.

The signal from the pressure regulation function 24 is transmitted to the temperature decrease mechanism 25. The refrigerant cooler 26 then operates. The coolant is sent to the cooling jacket 27. The pressure medium 6 is now cooled. The returned coolant is cooled again by the coolant cooler 26.

This prevents the pressure in the high-pressure vessel from increasing in the random fashion. The processing equipment can control the pressure by accurately detecting the temperature of the pressure medium 6 with the high-pressure vessel thermocouple 22. In addition, the working pressure of the pressure medium 6 can be accurately controlled to the desired processing pressure (for example, 500 MPa).

Conversely, the case will be described in which the rise of the temperature of the pressure medium 6 increases the pressure as the volume changes. This case provides higher pressure compared to what the pressurizing mechanism 10 performance achieves. Again, the pressure regulation function 24 receives the signal from the temperature detecting function 23. The pressure regulation function 24 determines that the pressure medium 6 should be pressurized.

The signal from the pressure regulation function 24 is transmitted to the heating mechanism 28. The heating mechanism 28 operates the hydraulic-medium heating heater (hereinafter referred to as "pressure medium heater") 30. The pressure medium heater 30 is installed in the high-pressure vessel. As a result, the pressure medium 6 is heated (eg 250° C.). Even in this case, the temperature of the pressure medium 6 is detected by the high-pressure vessel thermocouple 22. The processing pressure is controlled with high accuracy, and the pressure does not continue to exceed the pressure resistance limit of the high-pressure vessel. Should the pressure become too high, the temperature decrease mechanism 25 reduces the pressure to an appropriate processing pressure. As a result, the pressure of the pressure medium (eg 700 MPa) can be maintained. The pressure of this pressure medium makes it possible to obtain the high working pressures necessary to produce large size synthetic diamond products. (e.g., 7 GPa).

As the heating of the pressure medium 6 progresses, the pressure inside the high-pressure vessel becomes higher than the pressure (for example, 500 MPa) pressurized by the pressurizing mechanism 10. Therefore, the piping route leading to the high-pressure vessel can be removed from the flange surface of the check valve 11 on the pressurizing mechanism side. Thus, even if the pressurizing mechanism 10 is stopped or removed from the pressurizing mechanism 10, the processing apparatus of the present invention can continue high-temperature and high-pressure processing. In addition, when disconnecting the piping of the pressurizing mechanism 10 from the processing apparatus, the piping path can be closed by the gate valve 12. Moreover, the pressurizing mechanism 10 may be stopped when disconnecting the pipe or may be operated with its output reduced.

As another function, the decompressing mechanism 55 is installed. The decompressing mechanism 55 consists of the valve type such as the needle valve or the diaphragm valve. This valve is used when stopping the operation of the processing equipment or when there is an overpressure problem. The pressure of the pressure medium in the high-pressure vessel can be reduced by discharging the minute volume of the fluid that propagates the pressure of the pressure medium, on the order of several to several tens of cubic centimeters (cm^3), to the outside of the system.

On the other hand, since pressure gauges have poor measurement accuracy in this pressure range, they often cannot be used for pressure control. Therefore, the piezoelectric sensor 32 such as the load cell is installed for rough pressure monitoring.

Figure 3A:
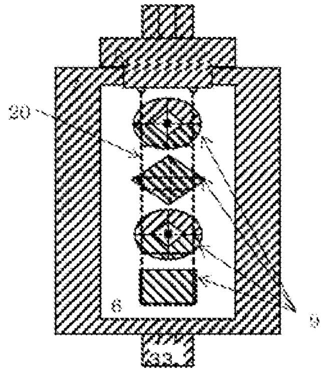
FIGS. 3A and 3B show an example of the binding mechanism (a. vertical installation, b. horizontal installation) in the high-pressure vessel in the pressure medium contact type (wet process).
Figure 3B:
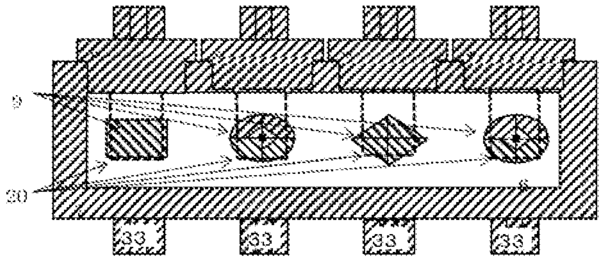

FIGS. 3A and 3B a the diagram schematically showing an example of the binding mechanism 20 (a. vertical installation, b. horizontal installation) in the high-pressure vessel in the pressure medium contact type (wet process) of the present invention. Also, the appropriate shape of the high-pressure cells 9, that is, the shape of the anvil 15, varies depending on the size and shape of the product. However, in the processing apparatus of the present invention, the high-pressure cells 9 can process any shape if it has the symmetrical shape.

In FIGS. 3A and 3B, the binding mechanism 20 has the shape suspended from the lid 8 in both vertical and horizontal placement. In this figure the axial forces exerted by the pressure medium 6 on the lid 8 are supported by the press frame 33. A plurality of High-pressure cells 9 installed in the high-pressure vessel is required to propagate pressure from the pressure medium 6 to all surfaces. As such, the body 7 of the high-pressure vessel should not meet the inner surface of the sidewalls and the bottom surface. The high-pressure cells 9 should expose substantially the entire surface. In addition, they must be fixed or suspended in the high-pressure vessel while maintaining the internal vacuum state. Therefore, the binding mechanism 20 has the shape and structure that reduces the area in contact with the high-pressure cells 9 as much as possible.

Also, the case where isotropic pressure cannot be obtained due to the influence of the binding mechanism 20 and product quality is affected will be described. In this case, the pressure medium circulation layer 48, which will be described later, may be provided in the portion that inevitably meets the high-pressure cells 9.

In addition, FIGS. 3A and 3B have the shape in which the binding mechanism 20 is suspended from the lid 8. However, the shape of this may be one supported from the floor surface or wall surface of the high-pressure cylinder, or one fixed. This is regardless of vertical or horizontal orientation. It may be possible to place or suspend several High-pressure cells with one securing device. Also, the structure for supporting the axial force may be the method other than the press frame 33, such as bolt fastening or loading.

Figure 4:
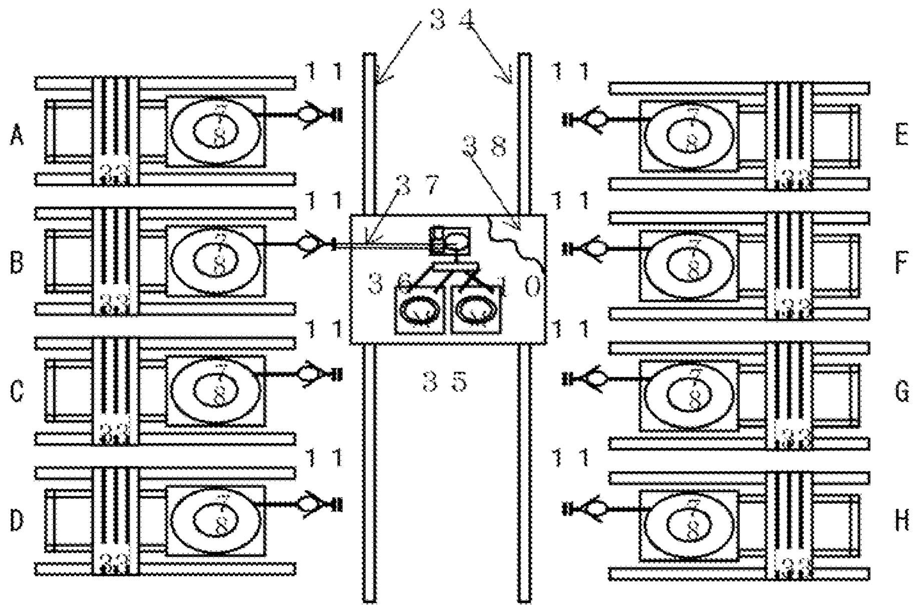
FIG. 4 shows an example of the processing apparatus in which one pressurizing mechanism is shared by a plurality of high-pressure vessels.

FIG. 4 shows an example of the processing apparatus of the present invention in which a plurality of vertically placed high-pressure vessels shares one pressurizing mechanism.

As described above (0052), after the initial stage of pressurizing the pressure medium therein in any one high pressure vessel, the processing equipment can deactivate the pressurizing mechanism 10. Nevertheless, high temperature and high-pressure processing can be continued. Also, the check valve 11 can be removed from the piping route connected to the high-pressure vessel at the position on the pressurizing mechanism 10 side. By connecting the removed piping route to another high-pressure vessel, another processing apparatus can be started up. Thus, the pressurization of the pressure medium in the pressure vessel of another processing unit can be started. FIG. 4 is the diagram for explaining the state in which a pressurization pump 36, which is one hydraulic pump type pressurizing mechanism 10, is shared by the bodies 7 and lids 8 of eight high pressure vessels (A to H).

One pressurization pump 36 is mounted on the movable cart 35 and can be moved to the predetermined position on the rails 34. After stopping and fixing at the predetermined position, the high-pressure hose 37 is attached to the pressurizing mechanism side of the check valve 11 of the high-pressure vessels from A to H. By operating the pressurization pump 36 here, the pressure medium is pressurized to the certain pressure (for example, 500 MPa) that its performance allows under normal temperature. Further, the pressure medium tank 38 is installed below the pressurization pump 36 of the movable cart 35.

In FIG. 4, eight high pressure vessels are connected to one pressurizing mechanism 10. However, the number of bodies 7 and lids 8 of the high-pressure vessels to be connected may be greater or less than this. The growth time depends on the size of the synthetic diamond product to be manufactured, and the time to be held at high temperature and high pressure may extend to several days. However, the retention time is mainly proportional to the size of the synthetic diamond product to be manufactured. First, the plan for the operation schedule of the processing equipment, which is determined by the size of the product to be manufactured, is formulated, and the number of high-pressure vessels that can be handled by one pressurizing mechanism is calculated. Based on these results, the business operator decides on plant equipment and layout plans, operation schedules, the number of operating personnel, and so on. This procedure is reasonable.

In FIG. 4, the pressurizing mechanism 10, the high-pressure vessel, the press frame 33, and the like are arranged in the plane, but alternatively, they may be arranged in another arrangement. That is, the moving means of the pressurizing mechanism 10 may be arranged vertically in the three-dimensional manner by using another form such as an elevator. These arrangements may be combined. Alternatively, the pressurizing mechanism 10, the high-pressure vessel, the press frame 33, etc. may be fixed, and the piping system may relate to the long high-pressure hose 37, although this may slightly reduce the work efficiency during treatment. By these methods, one pressurizing mechanism 10 can be shared by the bodies 7 and lids 8 of a plurality of high-pressure vessels.

Figure 5A:
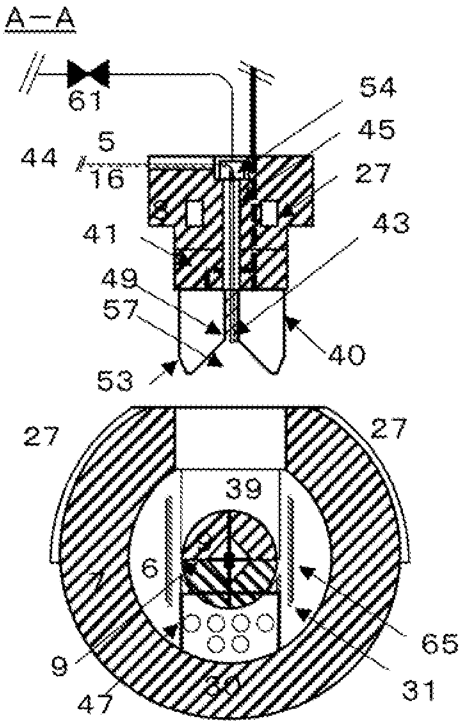
Figure 5B:
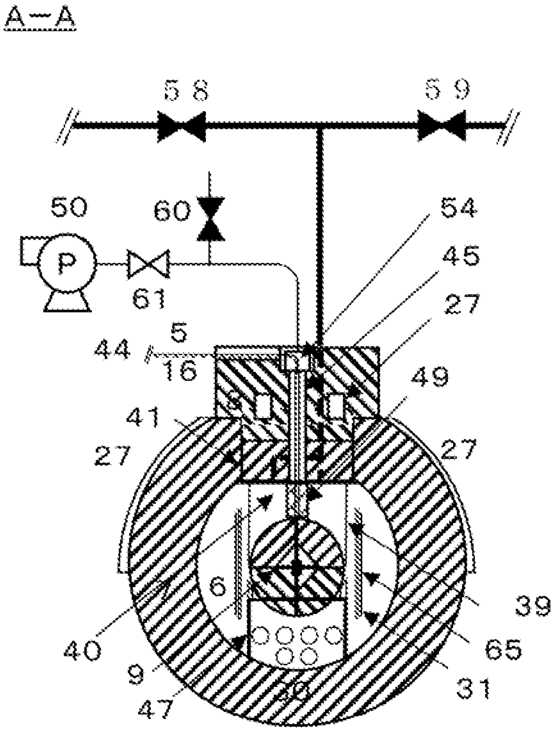

FIGS. 5A and 5B the schematic diagram of the configuration (a. before lid tightening, b. after lid tightening) of the pressure medium non-contact type (dry process) high-temperature and high-pressure processing apparatus using liquid medium hydrostatic pressurization. This is the schematic diagram of the preparatory stage. In the case of the pressure medium contact type (wet process), work efficiency is remarkably deteriorated due to dealing with the contamination of the pressure medium 6 adhering to the seal 19 made of the heat- and fluid-resistant elastic material and the high-pressure cells 9. This is as described in the second half of "Means for Solving Problems" above. One of the reasons is that the high-pressure cells 9 are heavy objects that may weigh more than 10 kilograms and weigh several tons. Therefore, the pressure medium non-contact type (dry process) liquid medium hydrostatic pressurization method is required. However, due to the structure of the apparatus, the seal 19 made of the heat- and fluid-resistant elastic material is necessary to obtain a plurality of products in one high-temperature and high-pressure treatment. Also, considerable ingenuity is required for the mechanism for feeding the pressure medium 6 there.

As shown in FIG. 5A, the hollow cylindrical upper molding die 40 is fixed to the lower portion of the lid 8 of the high-pressure vessel via the upper molding die mounting jig 41. The notching 53 serving as the guide mechanism is provided at the lower end of the upper molding die 40. The heat-resistant penetrating tube 43 is installed in the central hollow cylindrical portion of the upper molding die 40. The folded-type vacuum exhaust port 49 is installed around it. The metallic net spring pipe 57 like the medical stent is installed inside the folded-type vacuum exhaust port 49. The heat-resistant penetrating tube 43 has the heat-resistant and pressure-resistant structure. It houses current and instrumentation leads 5 and the internal thermocouple 16 inside. The high-pressure cell-cooling water pipe 44 is also accommodated if necessary.

On the other hand, the folded-type vacuum exhaust port 49 maintains its shape and outer diameter during vacuum suction. However, when the pressure medium presses the upper molding die 40, it closes due to the external force. The heat-resistant penetrating tube 43 and the atmospheric escape pipe 45 are connected to the suction pipe-connection box 54 existing in the space recessed from the surface of the lid 8. The connection nozzle with the vacuum suction line is provided there. The heat-resistant penetration tube 43 must be prepared for thermal expansion and interference with the high-pressure cells 9. Therefore, the penetration tube 43 is fixed to the suction pipe-connection box 54 via the spline bearing having the gap through which fluid can flow. In addition, the penetration tube 43 is movable several centimeters in the vertical direction. A flexible pipe leading to the vacuum pump 50 is connected to this connection nozzle. On the other hand, the heat-resistant penetrating tube 43 in the suction pipe-connection box 54 is notched in half Current and Instrumentation Lead 5, internal thermocouple 16, and high-pressure cell cooling water piping 44 now turn to the outer periphery of lid 8. After the direction change, wiring and piping are also installed in the space recessed from the surface of the lid 8. Therefore, the surface of the lid 8 has no projections, and the press frame 33 can be attached by sliding the surface of the lid 8.

Inside the lid 8, the atmospheric escape pipe 45 surrounds the heat-resistant through pipe 43. The folded-type vacuum exhaust port 49 is provided at the lower portion of the atmospheric escape pipe 45. The folded-type vacuum exhaust port 49 is connected by the spigot structure (the structure in which uneven parts mesh with each other) that can be freely contracted in the diameter direction. The metallic net spring pipe 57 is located inside the folded-type vacuum exhaust port 49.

As shown in FIG. 5A, the body 7 of the high-pressure vessel, which is placed horizontally, has an opening for the lid 8 at the top of the high-pressure cylinder. The lower mold 39 is fixed to this opening. The lower mold 39 is concave with bottom and has an open cylinder at the top with an opening for loading and unloading the high-pressure cells 9.

The high-pressure cells 9 are housed in the recess, and the bottoms of the heavy high-pressure cells 9 are supported by the lower support mechanism 47 via the lower molding die 39. At the contact portion between the support mechanism 47 and the high-pressure cells 9 via the lower molding die 39, the net having the shape conforming to the outer shape of the high-pressure cells 9 is provided on the support mechanism side. This mesh may be the porous pressure medium distribution layer 48. These structures allow the pressure medium 6 to flow freely even after the high-pressure cells 9 are fixed.

As shown in FIG. 5B, the pipe leading to the vacuum pump 50 is connected to the suction pipe-connection box 54 before and after the body 7 and the lid 8 of the high-pressure vessel are brought into close contact with each other. Also, as the lid 8 descends, the lid 8 is guided to the notching at the lower end of the upper molding die 40. Next, the upper mold 40 and the lower mold 39 are fitted together. In this state, the high-pressure cells 9 are sandwiched and wrapped. Before body 7 and lid 8 are brought into close contact, the air in the space between upper mold 40 and lower mold 39 is drawn to vacuum. In addition to the effect of the negative pressure, the pressure medium 6 is supplied from the gravity equation pressure-medium equalizing tank 42 into the upper molding die 40 to fill it. However, the operations at this stage, that is, the operations corresponding to the first to third steps described in (0040) are considerably complicated due to the opening and closing of valves. FIG. 5B illustrates the state in which the upper mold 40 and the lower mold 39 for one processing pit 46 have already been assembled. Therefore, it cannot be explained only by the state shown in FIG. 5B. Therefore, the configuration and operation thereof will be described with reference to FIG. 6, FIG. 7 and FIGS. 8A and 8C from the next section.

Figure 6:
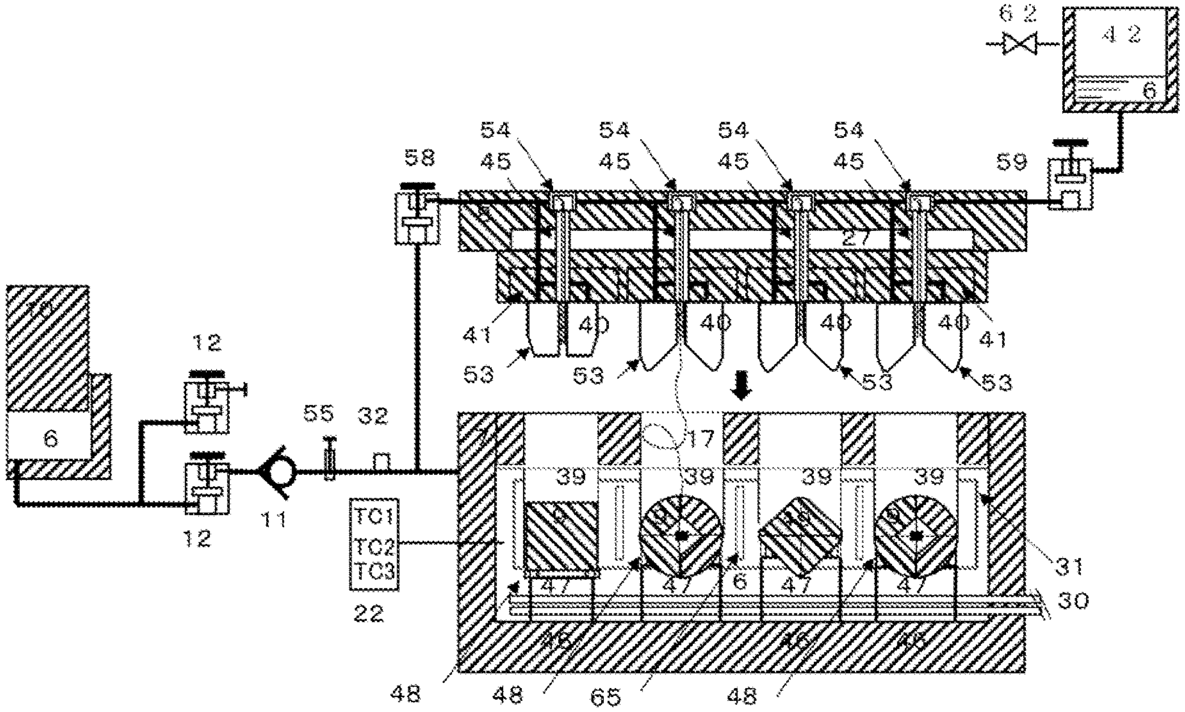
FIG. 6 shows an example of the configuration flow of the high-temperature and high-pressure processing apparatus using hydrostatic pressurization of the liquid medium for dry process in a preparatory stage.
Figure 7:
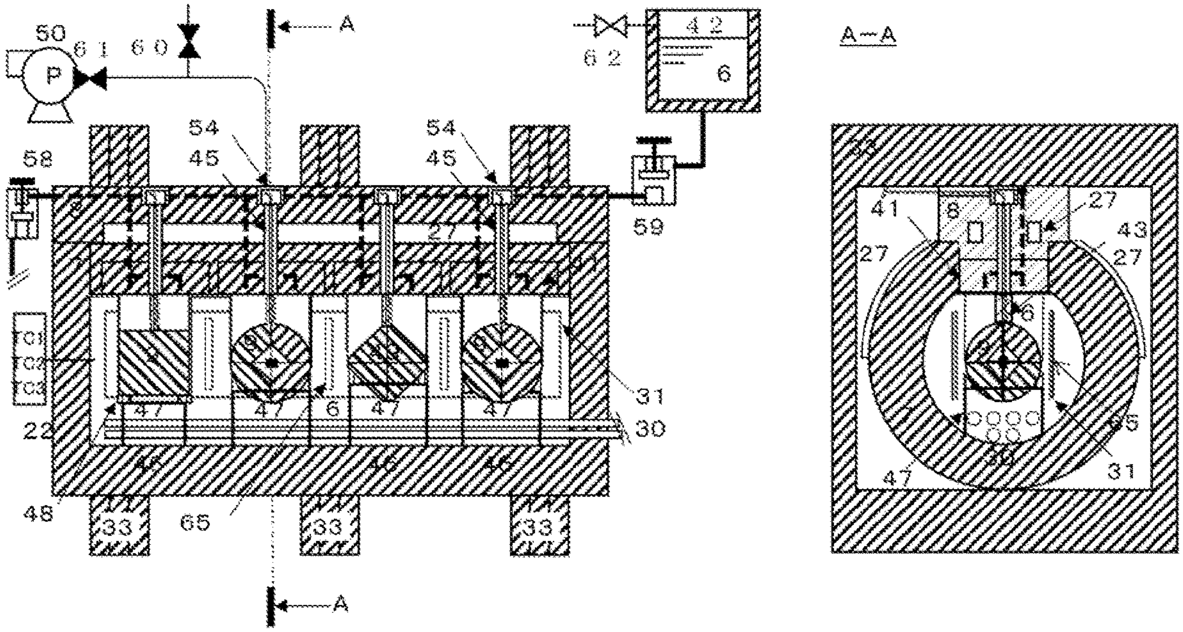
FIG. 7 shows an example of the configuration flow of the liquid medium pressurized high temperature/high-pressure processing apparatus for dry process after the preparatory stage.
Figures 8A, 8B, 8C:
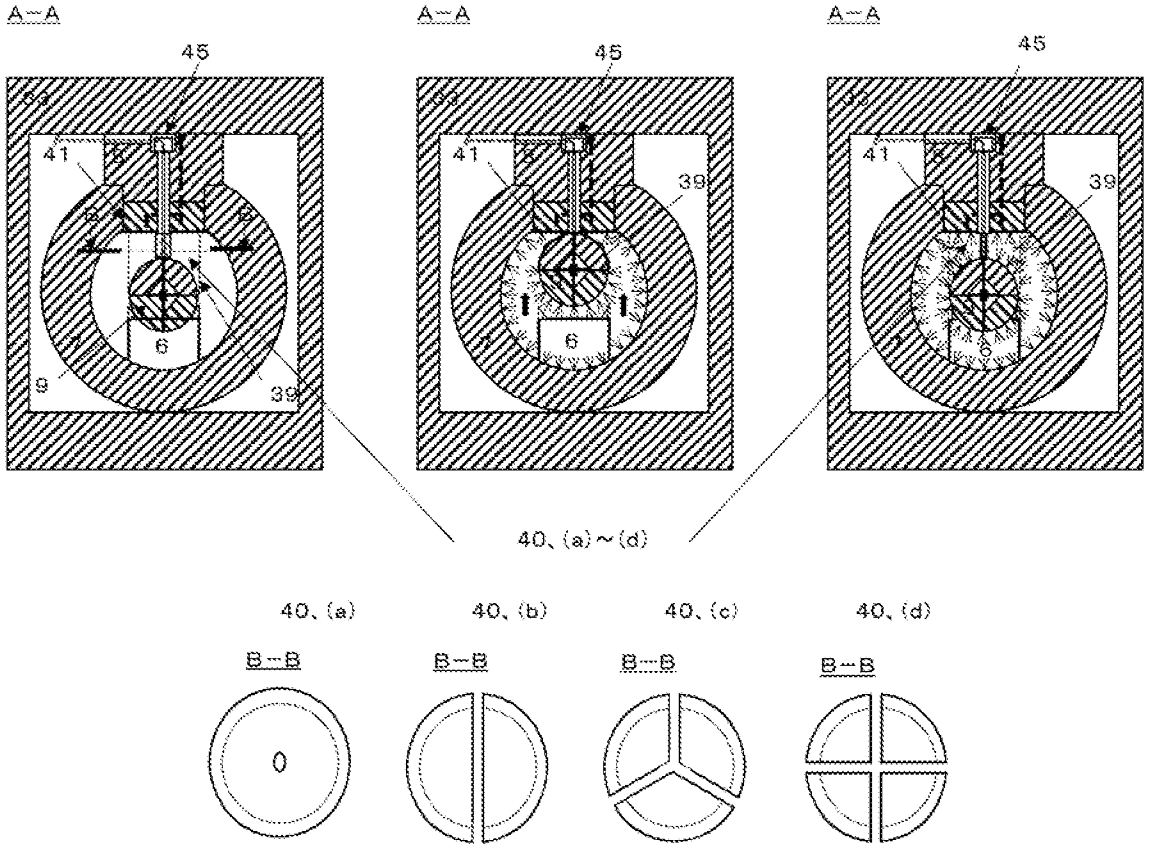
FIGS. 8A to 8C show an enlarged view of the upper molding die 40 for the fluid-proof [heat-resistant]elastic material and an explanatory view of its effect. This material is used in the dry process equipment described in FIG. 6 and FIG. 7.

FIG. 6 is an example of the configuration flow of the pressure medium non-contact type (dry process) high-temperature and high-pressure treatment apparatus using liquid medium hydrostatic pressurization in the preparatory stage of the present invention. FIG. 7 is an example of the configuration flow of the dry process apparatus before processing after going through the preparatory stage of FIG. 6. FIGS. 8A to 8C are an enlarged view of the upper molding die 40 for the heat- and fluid-resistant elastic material used in the dry process apparatus described in FIG. 6 and FIG. 7, and an explanatory view of the effect thereof.

Note that FIG. 6 and FIG. 7 do not show the overall configuration of the liquid medium pressurized high-temperature and high-pressure processing apparatus. FIG. 6 and FIG. 7 explain the difference in the structure of the equipment when the pressure medium non-contact type (dry process) is used. The overall configuration including these control systems was explained in FIG. 2 of the pressure medium contact type (wet process).

FIG. 6 shows the preparatory stage in which the high-pressure cells 9 are installed in the body 7 of the high-pressure vessel placed horizontally, and then the lid 8 is lowered to seal the body 7 in the dry process apparatus.

The pressure medium 6 in the body 7 of high-pressure vessel is confined by the inner wall surface of the body 7 and the lower molding die 39, and there is no portion where the pressure medium 6 is exposed to the atmosphere. The partition plate 31 is arranged in the pressure medium 6 in the body 7 and has an elongated copper plate 65 for measuring the average temperature on its surface. The high-pressure cells 9 are brought into close contact with the molding die by fitting the lower molding die 39 and the upper molding die 40 made of heat- and fluid-resistant elastic material. The High-pressure cells 9 in FIG. 6 have three types of shapes, and the number of them is four. One of the High-pressure cells, the regular octahedral type, is the high-pressure cell 56 of which all tip portions are cut off. The support mechanism 47 is installed immersed in the pressure medium 6. That is, FIG. 6 shows an example in which four processing pits 46 are formed in one high-pressure vessel.

On the other hand, the upper molding die 40 for the heat- and fluid-resistant elastic material shown in FIG. 6 is bag-like elastic material. The upper molding die 40 is fixed to the lower portion of the lid 8 by the upper molding die mounting jig 41. Its interior is filled with pressure medium 6. The pressure medium 6 inside the bag-shaped upper mold 40 is not exposed to the atmosphere.

The lower end of the upper molding die 40 has the notching 37 that serves as the guide mechanism. The upper molding die 40 has the shape along the high-pressure cells 9. In FIG. 6, the four-split upper molding die 40 is shown as an example, and the pipe for the pressure medium 6 is connected to each split bag. The gravity equation pressure-medium equalizing tank 42 is installed above the lid 8 and is of an open-top type and balanced with the atmosphere. In FIG. 6, the piping route of the pressure medium 6 is connected via the hydraulic-medium equalizing tank slice valve 59 in the open state. Also, the hydraulic-medium equalizing tank slice valve 62 of the gravity equation pressure-medium equalizing tank 42 is in an open state. On the other hand, the upper hydraulic-medium slice valve 58 on the pressurizing mechanism 10 side is closed.

The heat-resistant penetrating tube 43 penetrating the lid 8 is installed at the center of the upper molding die 40. Outside the heat-resistant penetrating tube 43 is the atmospheric escape pipe 45. The atmospheric escape pipe 45 also serves as an evacuation port for evacuating to vacuum. Also, this atmospheric escape pipe 45 is positioned inside the upper molding die 40. The metallic net spring pipe 57 is housed inside the folded-type vacuum exhaust port 49 below the atmospheric escape pipe 45. The upper ends of the heat-resistant penetrating tube 43 and the atmospheric escape pipe 45 are connected to the suction pipe-connection box 54 installed in the recess on the surface of the lid 8. The heat-resistant penetrating tube 43 has the pressure-resistant and heat-resistant structure. The heat-resistant and pressure-resistant current/instrumentation lead wire 5 and the internal thermocouple 16 are installed in the heat-resistant penetrating tube 43. The pressure-resistant high-pressure cell cooling water pipe 44 is installed here as required. The current/instrumentation lead wire 5 is connected to the high voltage cell 9 by the flexible connection cable 17 via the pressure-resistant connector. Note that not all figures are shown in FIG. 6.

FIG. 7 shows the state after the preparation stage of FIG. 6. FIG. 7 shows the state immediately after the lid 8 meets the body 7 of the high-pressure vessel after the lid 8 has been lowered. This is the pre-processing stage. However, at this stage, the pressurizing mechanism 10 is not yet in operation. Moreover, all the heating means are not in operation. The right side of FIG. 7 shows the cross-sectional view taken along line A-A.

When the lid 8 is lowered, the upper molding die 40 fixed to the lower portion of the lid 8 is lowered. During the descent, the inner wall of the lower mold 39 guides the notching 53 at the lower end of the upper mold 40. After that, this lower end eventually hits the upper part of the high-pressure cells 9. The lower end of the upper molding die 40 has the shape along the high-pressure cells 9. Furthermore, the lid 8 is lowered by remote control by means of the notching 53 at the lower end of the upper molding die 40 and the tapered guide mechanism at the bottom. As it descends, the upper molding die 40 is inserted into the lower molding die 39 (first step).

In the first step of the former stage, the upper molding die 40 enters into the concave portion of the lower molding die 39 by remote control and is fitted therewith. Next, in FIG. 7, the lid 8 of the high-pressure vessel is further lowered. However, the lowering of the lid 8 is temporarily stopped just before the lid 8 comes in close contact with the body 7. This is when the heat-resistant penetrating tube 43 approaches the position closest to the high-pressure cells 9. At this point, the closed space is formed by the lower mold 39, the high-pressure cells 9, and the upper mold 40. The vacuum pump 50 is now operated. As a result, the air in the gap between the lower molding die 39 and the upper molding die 40 is discharged by vacuum suction through the heat-resistant penetrating tube 43. At the same time, the atmosphere remaining in the high-pressure cells 9 is also discharged by vacuum suction. By evacuating residual atmospheric air, the gap between lower mold 39 and upper mold 40 is eliminated. In addition, the upper mold 40 stretched by vacuum pressure fills the space. As a result, both molding dies are in close contact with each other without any wrinkles. As a result, all the outer surfaces of the high-pressure cells 9 can be sandwiched between both molding dies without gaps. (Second step).

In the preceding second step, the upper molding die 40 is stretched and pulled by the vacuum pressure to increase the inner volume. This is the situation in which more fluid can be drawn into it. Here, in FIG. 7, the following operations are performed. First, the pressure medium adjustment tank gate valve 59 and the hydraulic-medium atmospheric release valve 60 of the piping connected to the gravity equation pressure-medium equalizing tank 42 are opened. Subsequently, the pressure medium 6 is supplied to the upper mold 40. As a result, the pressure medium 6 is loaded with atmospheric pressure and gravity. Therefore, the pressure medium 6 has no residual air, and air bubbles, voids, and the like are not mixed. Thereby, the inside of the upper mold 40 can be filled with the pressure medium 6.

(Third Step).

In FIG. 7, the lid 8 of the high-pressure vessel is further lowered to adhere to the body 7. At that time, the volume occupied by the upper mold 40 is slightly reduced. Thus, at the end of FIG. 7, the pressure medium 6 in the upper mold 40 is squeezed out. The squeezed pressure medium 6 overcomes gravity and flows out to the gravity pressure medium adjustment tank 42 above the lid 8. Therefore, the liquid level of the pressure medium in the gravity equation pressure-medium equalizing tank 42 is higher in FIG. 7 than in FIG. 6. By this operation, the pressure medium 6 in the high-pressure vessel is densely filled in the piping path without air voids or the like entering. At this stage, the flexible pipe leading to the vacuum pump 50 may be disconnected from the connection nozzle of the suction pipe-connection box 54. After the lid 8 is brought into close contact with the body 7 of the high-pressure vessel, the press frame 33 is installed by sliding or the like. This is for supporting the axial force applied to the lid 8 from the pressure medium 6. The lid 8 and the high-pressure vessel 7 are fastened by these. Also, the gate valve 59 on the side of the gravity type pressure medium adjusting tank 42 is closed, and the gate valve 58 on the side of the pressurizing mechanism 10 is opened. In dry process, after this, the pressurizing mechanism 10 is operated to pressurize with the same pressure medium 6. That is, the entire inner surface of the upper molding die 40 and the entire outer surface of the lower molding die 39 are simultaneously pressurized by hydrostatic pressure. As a result, the high-pressure cells 9 can be pressurized isotropically with a uniform pressure without gaps and precisely without directionality.

(Fourth Step).

FIG. 6 and FIG. 7 show the configuration in which four High-pressure cells 9 of three types in the body 7 of the horizontally placed high-pressure vessel are simultaneously processed without contact with the pressure medium. The types of the High-pressure cells 9 illustrated here are three, and the number thereof is four. Essentially, if the number of High-pressure cells 9 is two or more, there is no limit to type or quantity. However, in the case of pressure medium non-contact type (dry process), changing the type of high-pressure cells 9 for high-temperature and high-pressure processing in the processing pit 46 requires the following replacement of the devices. First, the upper mold mounting jig 41 for fixing the upper mold 40 and the lower support mechanism 47 must be replaced. In addition, it may be necessary to replace the lower mold 39 in some cases. Therefore, the pressure medium non-contact type (dry process) is not suitable when the type and number of High-pressure cells 9 to be processed vary from day to day. This method is suitable for efficient high-temperature and high-pressure treatment of many products with the composition that does not vary in type and number.

FIGS. 8A to 8C are an enlarged view of the upper molding die 40 for the heat- and fluid-resistant elastic material used in the dry process apparatus described in FIG. 6 and FIG. 7, and an explanatory view of the effect thereof. This is an enlarged schematic diagram of the upper molding die 40 for the heat- and fluid-resistant elastic material used in the pressure medium contactless apparatus. FIGS. 8A to 8C are described with the following symbols. FIG. 8A shows the state before pressurization by the pressure medium. FIG. 8B to FIG. 8C show the state after pressurization. Note that FIG. 8B indicates the force balance when the upper mold 40 is not present. FIG. 8C shows the force balance when the upper mold 40 is present. It should be noted that these show the structure at the cross-sectional position of the A-A line shown in FIG. 7. An enlarged view of the structure of the upper mold 40 at the cross-sectional position of the B-B line shown in FIGS. 8A to 8C is as follows. (a) is the integrated hollow cylinder. (b) is the vertical split type. (c) is the vertically divided three-part type. (d) is the vertically divided 4-part type.

In FIGS. 8A and C, and the magnitude and direction of the force exerted by the pressure medium 6 are indicated by arrows. This figure shows the state in which the pressure is balanced by the pressure medium 6 in the high-pressure vessel with the pressurizing mechanism 10 in operation. The pressure medium 6 pressurized by the pressurizing mechanism 10 has the following effects. In b, only the entire outer surface of the lower mold 39 is hydrostatically pressurized. On the other hand, in FIG. 8C, the entire inner surface of the upper molding die 40 and the entire outer surface of the lower molding die 39 are hydrostatically pressurized simultaneously. The pressurization of the pressure medium 6 in the high-pressure vessel creates force balance and imbalance, as shown in FIGS. 8B and C.

Without the upper molding die 40, the stress from above is insufficient. Therefore, the high-pressure cells 9 are lifted by the action of the pressure medium 6 as shown in b. As a result, the high-pressure cells 9 are pressed against the lid 8 with the non-isotropic force. If there is the upper molding die 40, the force from above is applied evenly. Therefore, the high-pressure cells 9 are isotropically pressurized while maintaining its original position. Any upper mold 40 of (a), (b), (c) and (d) can be isotropically pressed. The upper molding die 40 should be selected to conform to the shape of the upper portion of the high-pressure cells 9.

Figure 9A:
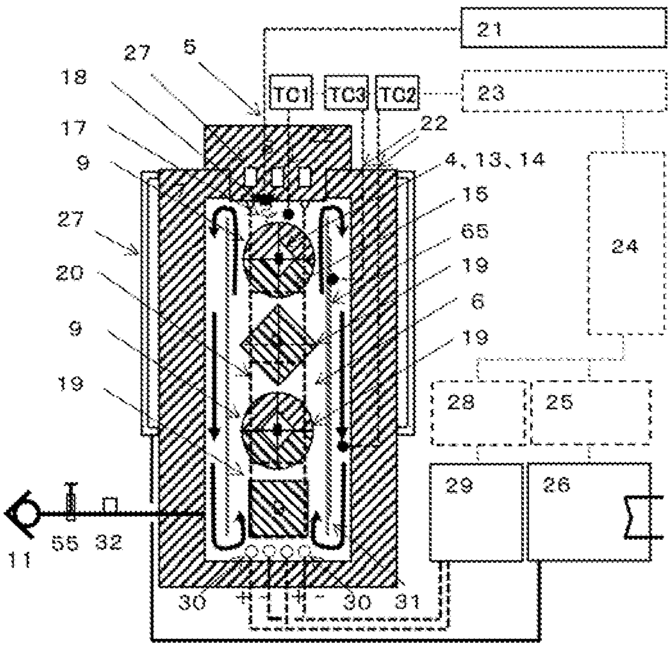
FIGS. 9A to 9B show a schematic diagram of the circulation situation of the pressure medium due to heat convection by a thermosiphon in the high-pressure vessel (a. wet treatment, b. dry treatment).
Figure 9B:
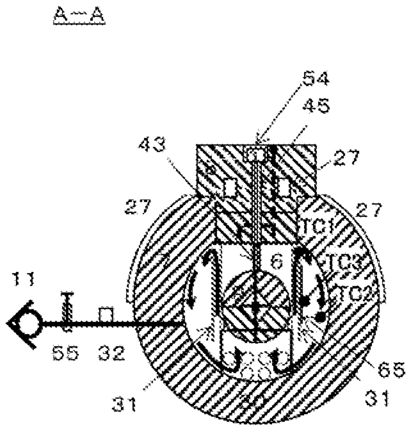

FIGS. 9A to 9B are the schematic diagram (a. wet process, b. dry process) of the heat convection circulation of the pressure medium 6 by the thermosiphon in the high-pressure vessel. As described in Example 2 below, under the operating conditions of the present invention, the viscosity of the organic solvent and the like used as the pressure medium 6 is approximately the same as that of water at normal temperature and pressure. Therefore, if the following arrangement is devised, thermal convection (thermosiphon) can be generated in the high-pressure vessel. That is, disposing the heating mechanism 28 installed in the high-pressure vessel and disposing the temperature reducing mechanism 25 by means of the cooling jacket 27 attached to the outer wall of the high-pressure vessel. The present invention is the system that intentionally increases the mass and volume of the pressure medium by housing two or more High-pressure cells in the high-pressure vessel to control the pressure of the pressure medium. Here, by preventing localization of temperature due to retention, the accuracy of temperature measurement and control, that is, the accuracy of pressure control in the present invention can be improved. FIG. 9A is the structure for wet process. FIG. 9B is the structure for dry process. In both cases, the heating sources within the high-pressure vessel are the internal heating source 14 within the high-pressure cells and the pressure medium heater 30 of the heating mechanism 28. The cooling jacket 27 is attached to the outside of the high-pressure vessel. In FIGS. 9A and 9B, both a and b show that the body 7 is a cylindrical high-pressure vessel (hereinafter referred to as "high-pressure cylinder"). Heating sources are arranged on the central axis in the body 7 of the high-pressure vessel at the central portion (the center position of the cylinder) and the bottom portion (the lower end of the cylinder). They are arranged vertically in the line on the central axis.

FIG. 9A shows an example of the structure capable of generating the thermosiphon in the pressurized medium contact type (wet process) high-temperature and high-pressure treatment apparatus using liquid medium hydrostatic pressurization in which the high-pressure cylinder is vertically placed. In the vertical installation, the High-pressure cells 9 suspended from the lid 8 are arranged vertically in the line on the central axis of the high-pressure cylinder. FIG. 9A shows an example in which four High-pressure cells 9 are suspended. The internal heat source 14 is housed inside each high-pressure cell 9. Further, the pressure medium heater 30 is arranged at the center of the bottom plate (lower end of the high-pressure cylinder). The cooling jacket 27 of one temperature reducing mechanism 25 is arranged in the upper half range from the approximate center position of the outer wall of the high-pressure cylinder. The cooling jacket 27 is also arranged inside the lid 8. Two partition plates 31 made of ceramic or the like are installed on both sides in parallel with the four High-pressure cells 9. The partition plate 31 is for the purpose of blocking mixing due to flow of fluids on both sides. The copper plate 65 for average temperature measurement, which is thin and elongated like the wire, is installed on this surface over the entire length in the vertical direction. The fluid (the pressure medium with the slightly reduced density) heated by two types of heat sources rises between the two partition plates 31, that is, in the central portion of the high-pressure cylinder. The heated fluid moved to the upper part of the high-pressure cylinder is cooled by the cooling jacket 27 inside the lid 8 and the cooling jacket 27 on the upper half of the outer wall of the high-pressure cylinder. Then, cold fluid (pressure medium with slightly increased density) descends along the outer wall. This system heats the lower end, and center of the central portion of the high-pressure cylinder and cools the upper half of the outer wall. That is, the heated fluid rises in the central portion and the cooled fluid descends in the outer wall portion. This forms the thermosiphon.

In addition, in the vertically placed high-pressure cylinder, the maximum temperature (TC1) after reaching a steady state is at the upper part of the uppermost high-pressure cells in the central part. Its lowest temperature (TC2) is at the lower end of the outer wall cooling jacket. The average temperature (TC3) is on the copper plate 65 for average temperature measurement. The average temperature does not differ greatly at any position on the long and narrow copper plate like the wire.

FIG. 9B shows the structure in which the high-pressure cylinder is placed horizontally. This is the non-contact pressure medium (dry process) high-temperature and high-pressure treatment apparatus that utilizes hydrostatic pressurization of the liquid medium and has the structure capable of generating the thermosiphon. FIG. 9B shows the structure at the cross-sectional position of line A-Ain FIG. 7.

The basic configuration is the same as that of FIG. 9A, but since the high-pressure cylinder is placed horizontally, a plurality of High-pressure cells 9 is arranged horizontally. Therefore, only one of the high-pressure cells 9 is visible on the A-A line cross section. Due to this structure, if the heat quantity of the internal heating source 14 is different in each high-pressure cells 9, the temperature inside the high-pressure vessel tends to be localized in the horizontal direction. Therefore, in the horizontal installation, the pressure medium heater 30 and the cooling jacket 27 should be controlled for each processing pit 46.

Heating of the fluid is provided by the internal heat source 14 at the center of the high-pressure cylinder and the pressure medium heater 30 at the lower end. Cooling is provided by the cooling jacket 27 on the upper lid 8 of the high-pressure cylinder and the cooling jacket 27 on the upper half of the body of the high-pressure cylinder. Mixing of fluids is blocked by two partition plates 31 in one high-pressure cell. As a result, the heated fluid rises in the central portion and the cooled fluid descends in the outer wall portion. That is, the thermosiphon is formed.

The maximum temperature (TC1), minimum temperature (TC2), and average temperature (TC3) are the same concept as the previous section.

EXAMPLES

Hereinafter, embodiments of the present invention will be described more specifically with the following configurations based on examples. In addition, the scope of the present invention is not limited by the examples.

Example 1: High-pressure vessel, lid, fixing system of high-pressure cells, and pressurizing mechanism Example 2: Type and physical properties of pressure medium, viscosity, and compressibility under high pressure Example 3: Fluid-Proof [Heat-Resistant] Elastic Material Used in Molds Example 4: Heat-resistant penetrating tube and foldable vacuum exhaust port Example 5: Temperature lowering mechanism for pressure medium, heating mechanism in high-pressure vessel, and thermosiphon structure Example 6: High-pressure parts such as high-pressure check valves Example 7: structure of high-pressure cells and the internal anvil Example 8: Type and Thermal Conductivity of Super hard Materials for the internal anvils in High-pressure cells

Example 1

In Embodiment 1, the high-pressure vessel, the lid, the method of fixing the processed material, and the pressurizing mechanism will be described. To facilitate pressure control, the high-pressure vessel of the present invention is required to have an internal volume as large as possible within a reasonable range, and to increase the weight and volume of the pressure medium in the piping system. Therefore, two or more High-pressure cells are installed in one high-pressure vessel. The main body of the high-pressure vessel is the cylindrical high-pressure cylinder that can easily ensure performance related to pressure resistance and is easy to manufacture. High-pressure cylinders are generally single-walled cylinders or composite cylinders made by shrink fitting. There is also the wire-wound structure (the structure in which piano wire or the like is wound around the outer circumference of the high-pressure cylinder to strengthen it). High pressure cylinders are typically designed according to the design fatigue curve that has a 99.99% or greater probability of non-failure. The structure and design of the pressure vessel, such as the shape and thickness of the high-pressure cylinder, are based on JIS B8265 (2017) and JIS B8267 (2015). In many cases, high-pressure equipment for mass production is frame-type in which the axial force applied to the lid is supported by the press frame.

When the high-pressure cylinder is used, the thickness of the vessel wall should increase exponentially as the diameter of the cylinder increases. The reasonable system would be the high-pressure cylinder with as small the diameter as possible. Therefore, only one row of High-pressure cells is provided in the diametrical direction of the high-pressure vessel. A plurality of them is provided in the longitudinal direction of the cylinder. As a result, if the installation orientation is vertical, it will have a vertically long shape. If the installation direction is horizontal, it will have the horizontally long shape. Also, in the case of wet process, both vertical and horizontal placement are possible, but in the case of dry process, only horizontal placement is possible due to restrictions on the mold.

In the case of the split sphere type with the diameter of 29 cm (corresponding volume is about 10 liters) of Non-Patent Document 2, the weight of one high-pressure cell is estimated to be about 700 Kg. Larger sizes can weigh several tons. In this case, the tensile strength of the lower mold made of elastic material is insufficient. Therefore, the elastic material cannot support the high-pressure cells. For the horizontal dry process equipment, the method of supporting the heavy high-pressure cells inside the high-pressure vessel must be considered.

The horizontal supporting method of the wet process apparatus can be any of the hanging type, the stationary type, and the sliding type. In the case of horizontal placement of the dry process equipment, the equipment is placed individually on the floor due to mold restrictions. The hanging type is also possible. In the case of the hanging type in the vertical wet process apparatus, the hanging net may be used under the lid. Also, in the case of the stationary type on the horizontal floor, if the flow path of the pressure medium is devised, it may be the stationary type of stacking separated by spacers. Table 1 summarizes the configurations that can be used for wet process and dry process, and the high-pressure cells support methods. Table 1 also describes the installation orientation of the body of the high-pressure vessel and the handling of the lid.

As the pressure medium pressurizing mechanism, the hydraulic or electric piston pressurizing device, the combination device of the electric high-pressure pump and the pressure amplifier, and the like are commercially available. Any model may be used. Hydraulic or electric piston pressure devices or reciprocating piston type pressure devices are often used when constant pressure control is desired in the high-pressure range. The maximum working pressure of the hydraulic piston pressure device reaches 700 MPa. Some electric high-pressure pumps alone reach about 100 MPa. In addition, when the pressurizing mechanism moves so that one pressurizing mechanism is shared by a plurality of high-pressure vessels as shown in FIG. 4 of the present invention, the compact and lightweight electric high-pressure pump is advantageous. An example of a combined device of the electric high-pressure pump and the pressure amplifier is the two-stage discharge type electric pump MP-75 (55 Kw, maximum operating pressure 70 MPa) manufactured by "Riken" Company. There is also the ultra-high pressure hydraulic booster IRE-10K-46 (maximum secondary pressure is 1000 MPa).

TABLE 1

| Classification of processing | Orientation | Quantity per container | Complicated handling | Support method: Hanging | stationary | sliding |
|---|---|---|---|---|---|---|
| Wet | Vertical | 3-5 pieces | complicated | ○ | Δ | x |
| Wet | Horizontal | 3-10 pieces | Somewhat complicated | ○ | ○ | ○ |
| Dry | Horizontal | 3-10 pieces | simple | Δ | ○ | x |

explanatory notes
○: preferable,
Δ: less favorable,
x: not feasible

Example 2

In Example 2, the type and physical properties, and the viscosity and compressibility under high pressure of the pressure medium will be described. In the high-temperature and high-pressure processing of the present invention, pressure is applied by hydrostatic pressurization, so the pressure medium must have a certain degree of heat resistance. The internal heating source that heats the processed material to 1300-1500° C. is in the high-pressure cells. The present invention is based on the idea of controlling the pressure inside the high-pressure vessel by measuring and controlling the temperature. Therefore, the pressure medium to be used must be the liquid fluid whose compressibility due to pressure and volume change rate or volume expansion rate due to temperature are known.

The first target for the high-temperature side use temperature (maximum use temperature) of the pressure medium used in the present invention is 250° C. The reason for this is that the elastic material used in the high-pressure vessel has the heat resistance limit. If the stretchable material with high heat resistance such as the composite material is developed, the next target is to raise the temperature to 300 to 400° C. as necessary. As a result, the pressurization performance due to thermal expansion of the pressure medium is further enhanced. In addition, the required pressure cannot be unconditionally determined only on the pressure medium side. This is because the working pressure correlates with the boosting effect which is proportional to the size of the high-pressure cells. Higher pressure limits are required to apply to larger size diamond synthesis. Therefore, the withstand pressure limit of high-pressure equipment such as high-pressure vessels and press frames is set at 1 GPa. As the first target, the performance of the pressurizing mechanism is set to 500 MPa, which is in the prior art. The multi-anvil, such as the segmented sphere type high-pressure cells, has the pressure multiplication factor of 10 to 100 times. Therefore, the high-pressure cells have the multi-anvil structure in order to reliably obtain the working pressure of 5 GPa required for diamond synthesis. With these, the present invention is directed towards the production of larger size synthetic diamonds. After the pressure is increased to 500 MPa by the pressurizing mechanism, the volume is expanded by heating the pressure medium to maintain the high pressure. After that, the pressure is further increased to about 700 MPa. This is the value that is acceptable for high-pressure parts such as valves that are currently available. This allows synthetic diamonds to be produced in larger sizes.

Candidates for the liquid pressure medium that can be used under the above temperature and pressure conditions are as follows, and their physical properties are shown in Table 2. Candidates are toluene, ethanol, methanol, benzene, and acetone. In addition, water, which is often used as the pressure medium in the prior art, is added to Table 2. These organic solvents may be mixed together or used as the mixed liquid with water.

On the other hand, if the type of pressure medium is selected, machine oil or synthetic oil may be used as in Non-Patent Document 2. However, these are known to be difficult to use even at room temperature. Rolling oil, base oil (base material for oil and grease), and alkyl naphthalene and alkylbenzene, which are synthetic oils, solidify at about 300 MPa. Gasoline engine oil and gear oil solidify at 500-700 MPa. Since poly-α-olefin does not solidify up to 1200 MPa, it may be possible to use it if its characteristic values such as compression rate and expansion rate are obtained. However, these oils may pollute the surroundings and make them oily.

Therefore, it should be noted that handling such as decontamination is difficult.

In addition, since silicone oil generally has the high compressibility due to pressure, attention should be paid to each type when using it for the purpose of the present invention. For example, dimethyl silicone oil has the volumetric shrinkage of about 15% under the pressure of 350 MPa at room temperature. These are commonly used as loose liquid springs. When the device is used in pressure-first mode, and the pressure medium is pressurized prior to heating, the pressure medium compresses significantly. Subsequent heating with the internal heating source may cause the pressure medium to undergo an unexpected volume expansion. The reason is that the pressure medium in the high-pressure vessel has the mass larger than expected. Therefore, dimethyl silicone oil is not highly applicable to the pressure medium of the present invention.

TABLE 2

| | Item Physical property value | | | | |
|---|---|---|---|---|---|
| Name of substance | density ($g/cm^3$) | specific heat (J/kg ° C.) | melting point (° C.) | Thermal conductivity (W/m/K) | volumetric expansion ($10^{-3}$/K) |
| water | 0.998 | 4,182 | 0.00 | 0.673 (80) | 0.21 |
| toluene | 0.878 | 1,679 | −94.99 | 0.119 (80) | 1.07 |
| ethanol | 0.789 | 2,416 | −114.50 | 0.150 (80) | 1.08 |
| methanol | 0.793 | 2,470 | −97.78 | 0.186 (60) | 1.19 |
| benzene | 0.879 | 1,738 | −5.50 | 0.137 (50) | 1.22 |
| acetone | 0.791 | 2,160 | −94.82 | 0.146 (60) | 1.43 |

Note
1) The physical properties in the table above are measured under normal pressure and at a temperature of 20 to 25° C.
Note
2) Values in parentheses indicate measured temperatures (° C.)
Note
3) The coefficient of expansion of water is highly dependent on temperature, reaching 0.0018/K at 220° C.
Reference)
Rika Chronology 2021, p. Physics 27, Physics 53, Physics 54, Physics 62, Physics 65

It is well known that the viscosity of liquids increases under high pressure. In the pressure vessel under high pressure, the liquid flow is different from that under normal pressure. When the viscosity of the liquid increases, the flow of the pressure medium in the high-pressure vessel becomes stagnant, and there is the tendency for the portion with the high temperature to occur locally. If there is the heating source or cooling mechanism in the high-pressure vessel, this tendency becomes stronger. Therefore, when measuring and controlling temperature, this point must be taken into consideration. The principled solution to this problem is the thermosiphon mechanism. First, the pressure dependence of the viscosity (m Pa·s) of the liquid used as the pressure medium and the temperature dependence of the part thereof are shown. Table 3 shows the viscosities of the candidate liquids for the pressure medium under high pressure registered in the Japanese National Institute of Advanced Industrial Science and Technology (AIST) Distributed Thermophysical Property Database. Table 3 shows the reported viscosities of the liquids under measured pressures from 0.1 to 400 MPa, with the measured temperatures given in parentheses in the table. Reported temperatures range from 10 to 160° C. In addition, information on a plurality of experimental reports is registered in this database. Therefore, due to differences in data acquisition conditions among experiments, numerical values such as measured pressure are slightly different. Therefore, in this specification, Table 3 is used for the purpose of grasping the global pressure/temperature dependence of viscosity.

At 400 MPa at the same temperature in Table 3, the viscosity of methanol is about twice and that of ethanol is about four times as high as under normal pressure conditions. In the case of toluene, the viscosity at 200 MPa does not change much compared to that under normal pressure.

Conversely, the viscosity of benzene at 400 MPa is about half of that under normal pressure. That is, depending on the type of substance, the viscosity at 400 MPa is 0.5 to 4 times higher than that under normal pressure.

Numerical values including temperature conditions in parentheses should be examined in detail in Table 3. The viscosities of substances other than benzene decrease by half when the temperature rises from room temperature to 75 to 160° C. Conversely, benzene is the only substance whose viscosity increases two to three times when heated.

TABLE 3

| Substance name | Viscosity at each pressure (mPa · s) and its temperature dependence Pressure 0.1 MPa | | about 100 MPa | | about 200 MPa | | about 400 MPa | |
|---|---|---|---|---|---|---|---|---|
| water(ref.) | 1.00 | (25) | 1.53 | (15) | 1.46 | (15) | 1.67 | (15) |
| | | | 1.27 | (20) | | | | |
| | | | 0.60 | (47) | | | | |
| | | | 0.45 | (67) | | | | |
| | | | 0.29 | (107) | | | | |
| | | | 0.21 | (147) | | | | |
| toluene | 0.58 | (25) | 1.18 | (25) | 0.52 | (30) | — | — |
| | | | — | — | 0.42 | (50) | — | — |
| | | | 0.70 | (75) | 0.39 | (75) | — | — |
| ethanol | 1.20 | (25) | 2.00 | (30) | 2.60 | (30) | 5.00 | (30) |
| methanol | 0.61 | (25) | 1.27 | (10) | 1.63 | (10) | 2.42 | (10) |
| | | | 0.87 | (30) | 0.99 | (30) | 1.54 | (30) |
| | | | 0.67 | (50) | 0.82 | (50) | 1.08 | (50) |
| benzene | 0.60 | (25) | — | — | — | — | — | — |
| | | | 0.66 | (75) | 0.44 | (75) | 0.33 | (75) |
| | | | 1.11 | (120) | 0.70 | (120) | 0.51 | (120) |
| | | | 1.78 | (160) | 1.50 | (160) | 1.03 | (160) |
| acetone | 0.310 | (25) | — | — | — | — | — | — |

Note 1)
Values in parentheses indicate measured temperature (° C.)
Reference) Japan Institute of Advanced Industrial Science and Technology (AIST) distributed thermophysical property database.

In Table 3 the viscosity of the liquid under high pressure should be considered further. Assuming the pressure (500 MPa) and temperature (250° C.) conditions of the pressure medium of the first target of the present invention, the pressure/temperature dependence is as follows. These are slightly different for each substance. However, the amount of increase is within about 0.5 to 2 times the viscosity at normal temperature and normal pressure. Its viscosity is expected to be about 1 m Pa s. That is, the viscosity of the pressure medium temporarily increases under high pressure but decreases with heating. This means that under the operating conditions of the present invention, the viscosity is approximately the same as that of water at normal temperature and normal pressure. Temperature measurement and control are relatively easy if the viscosity is about the same as that of water at normal temperature and normal pressure. However, the operation mode at startup does not have to be the complete boost-first type. The operation mode at the time of start-up should also simultaneously raise the temperature constantly. These measures are necessary for implementation. Even so, the decrease in viscosity due to the high pressure does not hinder the measurement and control of the temperature of the pressure medium. In other words, driving and control will not be lost.

Under high pressure, the liquid is compressed to some extent. In the present invention, the pressure medium should have the volume expansion ratio at the temperature (250° C.) used as the processing condition that is greater than the compression ratio at the applicable pressure (500 MPa). Therefore, the volume expansion coefficient of the liquid depending on the temperature is as shown in Table 2, and the compressibility (1E-9/Pa) of the liquid due to pressure is shown in Table 4. Note that—(blank) in Table 4 indicates that no compression rate was found in the data published in Rika Chronicles 2021. No figures were found for organic solvents. However, in the case of organic solvents, among compounds having the same number of carbon atoms, compounds with a greater degree of freedom in intramolecular rotation have a greater compressibility. According to this, the order of compressibility is linear compound>side chain compound>monocyclic compound>fused ring compound. In addition, among monohydric alcohols, the shorter the chain length, the more easily compressible. That is, according to this principle, the compressibility of ethanol, benzene, etc., for which data on compressibility of 500 MPa was not found, is theoretically equivalent to or lower than that of methanol. These viscosities are not much larger than the 2E-10/Pa of methanol.

TABLE 4

| substance name | pressure Compressibility for each pressure (1E−9/Pa) 0.1 MPa | 500 MPa | 1000 MPa |
|---|---|---|---|
| water | 0.36 | 0.18 | 0.12 |
| toluene | 0.9 | 0.22 | — |
| ethanol | 1.11 | — | — |
| methanol | 1.23 | 0.21 | — |
| benzene | 0.95 | — | — |
| acetone | 1.26 | 0.21 | — |

Note
1) All measurement temperatures are 20° C.,
Reference)
Rika Chronicles 2021, p. Physics 35

Table 5 shows the results of comparing the compression rate (%) and the expansion rate (%) of the pressure medium in the liquid state under high pressure. The compression rate (%) was calculated from the compression rate of each pressure (0.1, 100, 200, 500 MPa) reported in Table 4 and the like. The expansion ratio was calculated by multiplying the expansion coefficient of the physical property by the temperature (100 and 250° C.). In the present invention, the expansion rate at least at 250° C. should be greater than the compression rate at 500 MPa. The Compression column in Table 5 indicates the compression rate (%). Those at 0.1 MPa and 500 MPa were calculated from the liquid compressibility (1E-9/Pa) by the pressure in Table 4. For 100 MPa and 200 MPa, the values read from the figure of the reference in the lower column of the table were quoted. The quoted values are shown in brackets. Also, the compressibility of ethanol, benzene, etc. is considered to be about the same as that of methanol. Also, the compressibility does not exceed 15% at 500 MPa. Furthermore, its compression rate is generally about 11% or less. Therefore, the values <11% are also shown in the table here. The expansion column in Table 5 shows the calculated value of the expansion rate (%) calculated from the volume expansion coefficient of the liquid depending on the temperature in Table 2.

TABLE 5

| | compression Calculated value (Literature value) pressure Compression rate (%) | | | | expansion | | |
|---|---|---|---|---|---|---|---|
| | | | | | Physical property value Expansion rate | Calculated value Expansion rate | evaluation Applicability as single pressure |
| substance | 0.1 MPa | 100 MPa | 200 MPa | 500 MPa | ($10^{-3}$/K) | at 200° C. | medium |
| Water(ref.) | 0.4% | (4%) | (8%) | 9.0% | 0.21 | 3.8% | low |
| toluene | 0.9% | — | — | 11.0% | 1.07 | 19.3% | high |
| ethanol | 1.1% | (7%) | (11%) | –<11% | 1.08 | 19.4% | high |
| methanol | 1.2% | (8%) | — | 10.5% | 1.19 | 21.4% | high |
| benzene | 1.0% | — | — | –<11% | 1.22 | 22.0% | high |
| acetone | 1.3% | — | — | 10.5% | 1.43 | 26.7% | high |

Note 1)
Refer to Table 4 for the compression rate (1E–9/Pa) of the calculated value of the compression rate.
Note 2)
The coefficient of expansion is shown in Table 2, and the starting temperature is assumed to be 20° C.
Note 3)
The numbers in parentheses in the table above are the numbers read in FIG. 2 of Citation 1.
Citation 1) Kaoru Makita, Pressure effect on thermophysical properties of organic liquids, Thermophysical Properties, Vol. 1, No. 1 (1987).

According to Table 5, the expansion rate of organic solvents such as toluene, ethanol, methanol, benzene, and acetone at 250° C. is about 20% or more. Usually, the compression rate does not exceed 15% at 500 MPa. The compression ratio will generally be about 11% or less. Therefore, they alone satisfy the requirements of the pressure medium of the present invention. However, at 150° C., the expansion rate approaches approximately 15%. Therefore, more precise data are required for use at lower temperatures.

Figure 10:
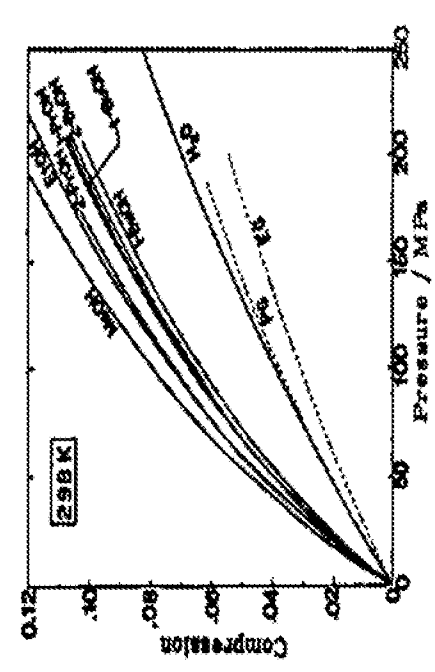
FIG. 10 shows a comparison of compressibility of pure alcohol and aqueous alcohol solution.
Figure 10:
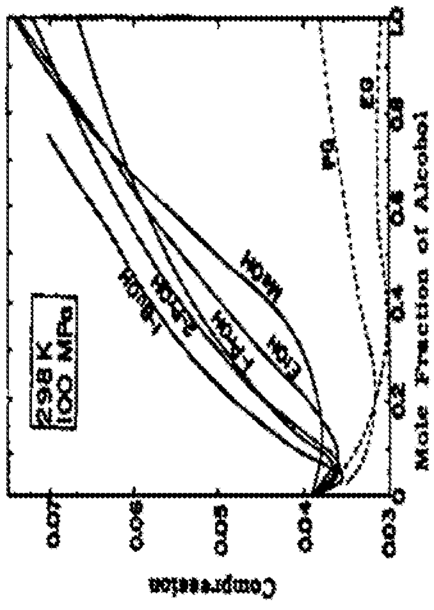

Certainly, water, which is the pressure medium frequently used in the prior art, has an expansion rate of 3.8% when used alone. Water has a compression ratio of 9.0%. For this reason, water does not meet the pressure medium requirements of the present invention. However, organic solvents such as ethanol, methanol and acetone are soluble in water. If the mixed liquid of these organic solvents and water is used as the pressure solvent, the compressibility can be freely selected according to the mixing ratio, as is widely known. FIG. 10 compares the compressibility at 100 MPa of pure alcohol substances such as ethanol and methanol ("FIG. 2" in FIG. 101 and alcohol solutions with low alcohol concentration ("FIGS. 8A to 8C" in FIG. 10). There are no peculiarities except for the presence of a concave portion where the compressibility is minimal in the region of the low alcohol concentration around mole fraction of 0.1 (mol/mol). The compressibility of the mixture increases almost proportionally as the alcohol concentration increases and approaches the compressibility of the pure substance of alcohol. Therefore, the compressibility can be freely set by the liquid mixture of the water-soluble organic solvent and water.

In conclusion, the flow of the invention is as follows. First, the temperature of the pressure medium is measured. Heating and cooling functions then control the temperature of the pressurized solvent. Based on this, pressure control is realized by volumetric expansion with pressure multiplication due to heat. This pressure solvent can be selected from toluene, ethanol, methanol, benzene, acetone, etc., and mixtures of these organic solvents. For water-soluble substances such as ethanol, methanol, and acetone, mixed liquids of these organic solvents and water can be selected.

Example 3

In Example 3, the Fluid-Proof [Heat-Resistant] Elastic Material used in the mold will be described. Table 6 shows the names of candidate materials for the following parts of the present invention, their properties such as tensile strength, elongation, heat resistance temperature and melting point, and their applicability. Target parts are the following stretchable parts. One is the heat- and fluid-resistant elastic seal in the pressure medium contact type (wet process). Another one is the mold such as the upper mold and the lower mold of the pressure medium non-contact type (dry process) processing apparatus. Even in the case of general elastic materials, the following materials can be applied to the present invention. These are silicone rubber with the maximum heat resistance of 280° C. and fluor rubber with the maximum heat resistance of 300° C. The maximum heat resistant temperature is hereinafter referred to as "heat resistant temperature". Here, the heat resistance temperature means the deflection temperature under load. Ethylene-vinyl acetate rubber has the heat resistant temperature of 200° C., which is slightly inferior in performance. In addition, the following materials have high heat resistance and high elongation, so they have high applicability. These are tetra-fluor-ethylene/hexa-fluor-propylene copolymer (FEP), tetra-fluor-ethylene/per-fluor-alkoxy-ethylene copolymer (PFA), and poly-tetra-fluor-ethylene (PTFE), which are heat-resistant fluorine resins. The shape of the molding die is the hollow cylinder or the 2- to 4-part split mold using the heat-resistant elastic material. Refer to Patent Document 6 for its specific shape and structure. However, among general elastic materials (values of heat resistance temperature (° C.) is given in parentheses), the following materials are difficult to use in the present invention. These are natural rubber (120), isoprene rubber (120), nitrile rubber (130), ethylene-propylene rubber (150), neoprene (130), urethane rubber (80). These are difficult to use in the present invention because the heat resistance temperature does not exceed 250° C., which is the intended operating temperature for the pressure medium.

Furthermore, thermosetting resins are difficult to use. However, among heat-resistant engineering plastics called super engineering plastics, there are also thermoplastic resins that can be applied to the present invention. When the thermoplastic resin is used, there is no problem with plastic deformation as long as it exceeds the heat resistance temperature by about 30% as long as the temperature is below the melting point. The reason for this is that the shape of the processed material is rather well-fitted, and wrinkles do not occur during evacuation. In the rightmost column of Table 6, applicability to the present invention when the elastic material is used alone is evaluated. Those having a heat resistance of less than 200° C. or having an elongation of less than 100% were judged to have low applicability. If the heat resistance is less than 250° C. or the elongation is less than 150%, the applicability is evaluated as moderate. Those having the heat resistance of 250° C. or more and the elongation of 150% or more were judged to have high applicability. When used alone, the higher the tensile strength, the better. However, the tensile strength was not evaluated independently because the insufficient amount can be replenished by reinforcing materials made of dissimilar materials as the composite material.

As a result, the present heat-resistant engineering plastic alone was evaluated to have medium to low applicability to the present invention from the viewpoint of elongation. However, poly-ether-ketone (PEK), polyimide (PI), poly-benzo-imidazole (PBI) and the like have high tensile strength and high heat resistance. Therefore, the composite material in which two or more types of resin are combined is used. That is, the composite material is formed in which these are used as reinforcing materials for the molding die and another thermoplastic resin having a large elongation is used as the sheet material for the molding die. This increases the applicability of heat-resistant engineering plastics to the present invention. For the upper molded body, the hollow cylinder with the central hollow portion or the 2- to 4-part mold is used, but the manufacturing method is preferably injection molding into the mold.

TABLE 6

| Material name | Type of elastic material | Tensile strength (MPa) | stretch (%) | Heatproof temperature (° C.) | melting point (° C.) | Unit applicability of elastic materials |
|---|---|---|---|---|---|---|
| NR | natural rubber | 3-30 | 100-1000 | 120 | — | low |
| NBR | synthetic rubber | 5-25 | 100-800 | 130 | — | low |
| Si | synthetic rubber | 4-10 | 50-500 | 280 | — | high |
| EVA | synthetic rubber | 7-20 | 100-600 | 200 | — | medium |
| FKM | synthetic rubber | 7-20 | 100-500 | 300 | — | high |
| FEP | Thermoplastic, C. | 20-30 | 300-350 | 200 | 246-280 | high |
| PFA | Thermoplastic, C. | 25-35 | 200-450 | 260 | 280-310 | high |
| PTFE | Thermoplastic, C. | 20-35 | 200-400 | 260 | 327 | high |
| PPS | Thermoplastic, C. | 80 | 50 | 230 | 290 | low |
| PEK | Thermoplastic, C. | 100 | 60~150 | 260 | 373 | medium |
| PEEK | Thermoplastic, C. | 100 | 60 | 250 | 343 | low |
| PI | Thermoplastic, (Note 2) | 115 | 100 | 400 | — | medium |
| PAI | Thermoplastic, Am | 186 | 15 | 230 | — | low |
| PES | Thermoplastic, Am | 84 | 80 | 230 | — | low |
| PBI | Thermoplastic, Am | 130 | 30 | 427 | — | low |

Abbreviations

Note)

NR: Natural rubber,

NBR: Nitrile rubber,

Si: Silicone rubber,

EVA: Ethylene/vinyl acetate rubber,

FKM: Fluor rubber,

FEP: Tetra-fluor-ethylene/propylene hexafluoride copolymer,

PFA: Tetra-fluor-ethylene Fluorinated ethylene/per-fluor-alkoxy-ethylene copolymer, PTFE: poly-tetra-fluor-ethylene, PPS: poly-phenylene sulfide, PEK: poly-ether-ketone, PEEK: poly-ether-ether-ketone, PL: polyimide, PAI: poly-amide-imide, PES: poly-ether-sulfone, PBI; Poly-benzo-imidazole, C: crystalline, Am: amorphous Note 1)

The heat resistance temperature in the above table basically indicates the deflection temperature under load as the maximum heat resistance temperature, but various values have been reported.

(Note 2)

Polyimide (PI) is basically crystalline, but it is sometimes classified as amorphous due to its slow crystallization rate.

Note 3)

But here, Ketones are generally hard and have low elongation, but the elongation value of poly-ether-ketone (PEK) is an estimated value.

Example 4

In Example 4, the heat-resistant penetrating tube and the foldable vacuum exhaust port will be described. These are placed in the central cylindrical portion of the upper mold of the dry process equipment.

The heat-resistant penetration tube of the present invention penetrates the upper mold and has a heat resistance that matches the working temperature of the pressure medium (eg, 250° C.). This heat resistant penetration tube houses the power and measurement leads. In addition, the cooling water piping (inlet and outlet) of the high-pressure cells is accommodated as necessary. This heat-resistant penetrating tube can maintain its shape even under working pressure (for example, 1 GPa). This is due to the inherent strength of materials and structures that maintain their shape.

On the other hand, the vacuum exhaust port is not expected to maintain its shape at the working pressure, and a foldable vacuum exhaust port with the following roles is installed. It has the larger diameter than the heat-resistant feed-through tube that passes through the upper mold during vacuum suction prior to high-temperature and high-pressure processing. This diameter ensures the flow path for the atmosphere (gas). The conditions of use are normal temperature and pressure from vacuum to near normal pressure. Furthermore, this vent does not affect the ability of the upper mold to provide isotropic pressure under hydrostatic pressurization.

At first glance, it may seem that the heat-resistant penetrating tube and the folded-type vacuum exhaust port require contradictory performance. However, these can satisfy the requirements of the present invention by forming coaxial composite structures having different functions inside and outside.

The heat-resistant penetrating tube allows pressure-resistant power supply and instrumentation lead wires to pass through the hollow part. Also, the cooling water pipe having the large wall thickness is passed through the hollow portion. Therefore, the thick metal pipe with high strength is preferable. The extra space between the lead wire and the thick-walled pipe is densely filled with metal powder such as stainless-steel powder to form the solid pipe to ensure greater strength. If there is no dimensional leeway in arranging the heat-resistant penetration tube in the lid or upper mold of the high-pressure vessel, the heat-resistant penetration tube is made of pure titanium or the titanium alloy with high strength. For thicker pipes, the solid titanium round bar is drilled. Piping materials made of titanium comply with JIS H4635 or JIS H4650 TB340.

The strength of the folded-type vacuum exhaust port is supported by the constant value slightly stronger than the vacuum pressure resistance. This secures the space of the hollow portion outside the heat-resistant penetrating tube in the center of the upper mold. For example, the folded-type vacuum exhaust port has the structure comprising the metal mesh tube made of the wire material such as the titanium alloy woven into the mesh to form the spring and the outer cylinder made of the thin heat-resistant elastic material. This secures the space in the central hollow portion of the upper mold. The supporting material in the central hollow part of the upper mold is called the metallic net spring pipe. This metallic net spring pipe has the shape like the stent that is widely used for medical purposes. However, the folded-type vacuum exhaust port is slightly different in that it uses the slightly thicker wire to increase the spring force a little, so that it can maintain its shape to some extent during vacuum suction.

Medical stents are made of stainless steel or titanium alloy and are several centimeters long. Stents have been widely used for medical purposes such as coronary artery, biliary, esophageal, large intestine, and intracranial artery dilatation operations, and currently exist in various diameters. The shapes of coronary stents are classified into tube type, coil type and mesh type. In addition to stainless steel, tantalum or nickel-titanium alloys are used for the frame material. Shape-memory nickel-titanium alloy stents are expanded by body temperature when placed in the deflated state. This shape memory alloy stent has a certain level of spring force and is therefore relatively close to that of the present invention.

The stent made of the shape memory alloy was invented more than 30 years before the present invention, but at present there is no specification or standard for its material or manufacturing method. In addition, even today, medical stents themselves are subject to difficult requirements such as installation position accuracy, deployment performance at the target position, adhesion to walls, and the like. Medical stents are manufactured by repeating numerical analysis and prototyping for each of the numerous combinations of design conditions. On the other hand, the required performance of the metallic net spring pipe for the folded-type vacuum exhaust port of the present invention is clear. In addition, it can be installed visually.

Compared to medical stents, the shape and structure are similar, but metallic net spring pipes are technically quite easy to design and manufacture. Therefore, as an example of the method of manufacturing the metallic net spring pipe for the folded-type vacuum exhaust port, refer to the past patent document 7, which applied for materials and the manufacturing method of the stent made of the shape memory alloy. The folded-type vacuum exhaust port conforms to the medical stent but is actually manufactured in the considerably simplified manner.

Example 5

In Example 5, the following items are explained. They are 1) the cooling jacket attached to the outer wall of the high-pressure vessel and the cooling mechanism attached, 2) the heating mechanism installed inside the high-pressure vessel, and 3) the thermosiphon structure.

The pressure regulation function receives the signal from the temperature detecting function that controls the temperature of the pressure medium within the high-pressure vessel. The temperature decrease mechanism operates when the pressure regulation function determines that the pressure should be reduced. The temperature decrease mechanism operates the refrigerant cooler to send the refrigerant to the cooling jacket outside the body of the high-pressure vessel. The returned refrigerant is cooled by the refrigerant cooler. The position where the cooling jacket is attached is determined by the thermosiphon structure, which will be described later. The refrigerant cooler is common commercial chiller equipment. The cooling capacity required by the refrigerant cooler is determined by the amount of heat generated within the high-pressure cells. This is the amount of heat of the internal heating source and the amount of heat of the heating mechanism installed in the high-pressure vessel. Since the working temperature of the pressure medium to be cooled is about several hundred degrees Celsius, the chiller device may be either water-cooled or air-cooled. Alternatively, the refrigerant may be gaseous. This gas is Freon or Freon substitute gas or the like. Furthermore, the refrigerant may be liquid.

The heating mechanism operates when the pressure regulator determines that pressure should be increased. The heating mechanism operates the pressure medium heating heater power supply to heat the pressure medium with the pressure medium heating heater installed in the high-pressure vessel. The position where the pressure medium heating heater is attached is determined by the thermosiphon structure. The pressure medium heater is the sheath heater or the resistance heater that is high pressure and liquid resistant. The required heating capacity is determined mainly by the temperature to be raised and the weight of the pressure medium in the high-pressure vessel. It should be noted that the heating of the pressure medium need not be rapid. Considering the time (for example, several days) required to produce synthetic diamond, it suffices to reach the predetermined temperature within, for example, one day. The pressure medium heating heater power supply may be of the direct current type or the alternating current type. The pressure medium heater may be the plate type, cartridge type, flexible type, or micro type heater. The heater may have the built-in thermocouple. The resistance heating element may be the metal rod (wire), graphite, SiC, or the like.

The thermosiphon phenomenon is the convection phenomenon based on the principle that heated fluid becomes lighter and rises, and cold fluid becomes heavier and descends. In general, the density of the liquid has the negative correlation with temperature, that is, the density decreases as the temperature rises. There are few reports of density data showing temperature dependence under high pressure. However, as shown in Table 5, for liquids such as toluene, ethanol, methanol, and benzene, the volume expansion effect is superior to the volume compression effect due to pressure. Even under the high pressure of 500 MPa, their densities decrease as the temperature rises. Further, as described above in Example 2, under the pressure conditions (e.g., 500 MPa) and temperature conditions (e.g., 250° C.) of the pressure medium of the present invention, the viscosity of the pressure medium of the candidate organic solvents is about 1 mPa/s. This is expected to be like the viscosity of water at normal temperature and pressure. Therefore, in principle, the pressure medium under the temperature and pressure conditions of the present invention can generate the thermosiphon due to the density difference caused by the temperature difference between heating and cooling of the pressure medium.

To generate the thermosiphon inside the high-pressure cylinder, which is the main body of the high-pressure vessel, the heating mechanism and the cooling mechanism must be arranged appropriately. Also, vertical partitions should be installed to prevent hot and cold fluid streams from intermingling. The suitable material for the partition plate is ceramic and the like, which has poor thermal conductivity. On the surface of the partition plate (support plate), the thin, elongated metal plate made of the material with high thermal conductivity such as copper or aluminum is installed over the entire length in the vertical direction. The thermocouple (TC3) for measuring the average temperature is brought into contact here to measure the average temperature of the pressure medium. The heating sources in the high-pressure vessel are the internal heater in the high-pressure cells and the pressure medium heater of the heating mechanism. These are arranged vertically in the line at the central portion (the center position of the cylinder) and the bottom portion (the lower end of the cylinder) on the central axis. The cooling jacket of one of the cooling mechanisms is arranged in the range from the center to the upper half of the outer wall of the high-pressure cylinder. This system heats the lower end and center of the central portion of the high-pressure cylinder and cools the upper half of the outer wall. As a result, a thermosiphon is formed in which the heated fluid rises in the central portion and the cooled fluid descends in the outer wall portion.

The thermosiphon of the high-pressure cylinder described above determines the maximum temperature at the position where the temperature in the high-pressure vessel should be the highest and the minimum temperature at the position where it should be the lowest. The average temperature of the pressure medium is obtained by measuring the copper plate attached vertically on the partition plate (support plate) for average temperature measurement. This copper plate is the elongated high thermal conductive metal plate like the wire. This copper plate may be installed by rotating the partition plate once in the vertical direction.

However, if the initial heating degree after starting the apparatus is small, the measured temperature tends to indicate various erroneous values (variation). The reason for this is that heat transfer depends only on heat conduction in the pressure medium, so there is no fluid movement due to thermal convection. Also, it should be noted that if there is abrupt heating or cooling in the middle, the measured temperature will fluctuate for the while. When the certain degree of heating is exceeded after the passage of time from the start of heating, the fluid begins to circulate due to heat convection. After that, the rotation direction of the fluid is maintained, so the measured temperature is stabilized. The flow rate depends on the degree of heating, and if the degree of heating is constant, the flow is steady. This stabilizes the measured temperature.

On the other hand, since the present invention uses hydrostatic pressurization in principle, the pressure of the pressure medium is not localized. Therefore, the pressure is the same at any position in the high-pressure vessel. Considering the purpose of pressurizing the pressure medium by thermal volume expansion of the pressure medium according to the present invention, the information on the numerical value of the temperature unevenly distributed locally in the pressure medium is not so important. That is, it suffices to know the average representative temperature.

Therefore, in the case of the configuration of the present invention, the average temperature (TC3) is used as the representative temperature during steady operation. However, the average temperature fluctuates at the start of operation or during sudden heating or cooling. Therefore, when obtaining the representative temperature, logical determination is made by taking into consideration the information of the maximum temperature (TC1) and the minimum temperature (TC2), which have the small range of variation. The representative temperature at the time of start-up, rapid heating or cooling is information that can be easily clarified empirically. This information can be input to the condition judgment function of the control device that reflects the empirical rule.

Vertical arrangement is possible for the wet process. However, the distance between the rise of the hot fluid and the descent of the cold fluid of the thermosiphon described above is increased. As a result, the sensitivity of temperature measurement and control of the pressure medium becomes dull even in the steady state. Therefore, in addition to the above-described three temperature measurement points, the number of measurement points may be increased in the vertical direction. However, in that case, the monitoring and management will take time and effort.

In the horizontal arrangement, both the ascending and descending distances are short. This is the same for dry process and wet process. Therefore, there is no problem that monitoring and managing the temperature of the pressure medium requires time and effort. However, when many High-pressure cells are installed in one high pressure vessel, the ambient environment conditions are different. For example, one is the mutual influence of the difference in the amount of heat generated by the internal heat sources of the High-pressure cells installed in the periphery and the center of the horizontal arrangement. Another is the difference in the outer surface area where the high-pressure cylinder is allowed to cool. Therefore, to obtain a more stable steady state, each high-pressure cells should have three temperature measurement points. Therefore, the heating mechanism and cooling mechanism should be controlled separately.

Example 6

As described in Example 2, the first target for the design pressure limit of the high-pressure equipment such as the high-pressure vessel and the press frame was set to 1 GPa. To utilize this, physical property data such as the compressibility of the pressure medium in the pressure range of 400 MPa or higher should be obtained. These physical property data can be obtained with the DAC device, or the like attached to the side of the device. On the other hand, the maximum working pressure of the available pressure medium is influenced by the pressure limit of high-pressure components such as high-pressure valves attached to the high-pressure piping. DAC is manufactured and sold by Shimizu Seisakusho in Japan.

In the case of the configuration of the present invention, the displacement of the pressure medium is reduced under high pressure. Therefore, the high-pressure pipes are thin, and the size of the high-pressure parts to be used is also small. According to catalog products of domestic manufacturers, the pressure resistance limit of high-pressure parts is limited to 20 to 70 MPa. These are used in power plants. However, in the ultra-high-pressure area, the European company BUTECH (the Japanese distributor is Sunny Trading Co., Ltd.) supplies various high-pressure specification products. The partition valves (two-way valves and three-way valves) with a withstand pressure limit of about 1 GPa are already on the market as catalog products. Its material is SUS316. The model number is 150V51-316WP for the 2-way valve and 150V53-316WP for the 3-way valve.

On the other hand, as the check valve, the ball type check valve with the spring is sold. Its model number is 60BC9-316WP-316S. However, this pressure resistance limit is several hundred MPa, which is insufficient for use in the present invention. The manufacturer states that it can be changed if the material can be machined. Alternates are Hastelloy™, Inconel™, Titanium, ALLOY 400, and the like. As an option, products with pressure resistance limits up to 1,034 MPa are available. Additionally, it can be changed to a titanium alloy whose tension is about three times that of pure titanium. The titanium alloy is, for example, Ti-6A1-4V corresponding to ASTM Grade 5 or Ti-10V-2Fe-3Al corresponding to AMS4983.

Check valves are often of the ball type. In addition, there are types such as disk type, swing type, wafer type, and lift type. Also, the disk type and the ball type are spring equipped. Those with springs are the same size as piping parts such as nipples and reducers. On the other hand, other valves are of the large size having the water chamber with the valve body in the flow path, like globe valves, gate valves, relief valves (safety valves), and the like. Also, due to the high working pressure, the water chamber (casing) and the valve support must have great strength. These types result in large, forged valves. There are no technical problems in designing and manufacturing these. Depending on the situation, it may be necessary to install the custom-designed giant forged valve. However, check valves that are reinforced by wrapping piano wire around the outer periphery of existing catalog products can also be used. Alternatively, the spring-loaded ball type check valve described above, which is made of the different material, can also be used.

Example 7

Example 7 describes the high-pressure cells. Each high-pressure cell has the anvil, the processed material, the internal heating source, and the internal thermocouple for temperature measurement. The internal heating source may have the built-in thermocouple. Current and instrumentation leads for the internal heating source and internal thermocouple are exposed from the high-pressure cells. These wires connect to external connectors. Cooling water piping (inlet/outlet) is exposed from the high-pressure cells as required. These pipes connect to external industrial water or tap water. In wet process, each high-pressure cell is wrapped with the heat- and fluid-resistant elastic seal. In dry process, the high-pressure cells are directly placed in the mold. The present invention relates to the pressurizing device for manufacturing synthetic diamond. Therefore, the type and structure of the high-pressure cells are not requirements, except the material of the internal Anvil made of ultra-hard material. Any shape may be used if the high-pressure cells have the symmetrical shape. Examples of such shapes are spherical, hexahedral (cubic), and octahedral. Note that the belt-type high-pressure cell is out of the scope of this description because it does not have the symmetrical shape.

Figure 1:
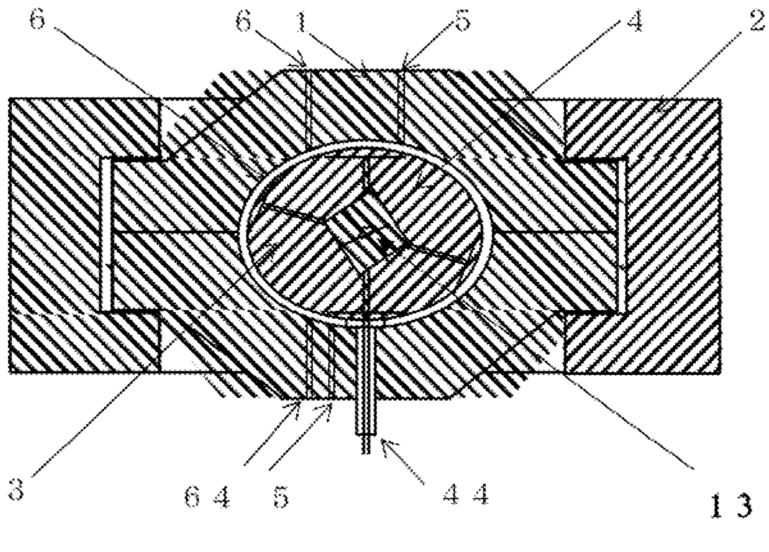
FIG. 1 shows the schematic diagram of the pressurization device and the high-pressure cell in the conventional hydrostatic pressurization method for academic research; (The hydraulic pressure device is integrated with the high-pressure cell).

For example, the segmented sphere type high-pressure cells of the conventional hydrostatic pressurization device (BARS device) for academic research shown in FIG. 1 may be used as it is. The range to be used is the portion of the structure inside the oil layer of the drive oil. In addition, the cube type (cubic type anvil) used in the CCP apparatus described in the above "Background of the invention" may be used as it is. Furthermore, the regular octahedral shape such as the internal Anvil described in the above "Background of the invention" may be used as it is.

However, the temperature of the pressure medium rises due to heat transfer from the internal heat source of the high-pressure cells. For application in the present invention, it is necessary to consider the temperature rise of the pressure medium and to control the temperature by heat transfer.

In the production of synthetic diamond, the processed material must be heated to 1300-1500° C. As such, the internal heating source is in the internal anvil of the high-pressure cells. The BARS device of FIG. 1, described in the "Background of the invention" section, uses tungsten carbide (WC) for its internal anvil, which has good thermal conductivity. After a few days of operation, the BARS device experienced an increase in the temperature of the oil acting as the pressure medium until the working pressure of the hydraulic pump and the processed material became uncontrollable. Ultimately, the device solved the problem by running cooling water across and across the high-pressure cells to remove heat from the internal heating source. That is, the cause of the uncontrollable pressure rise in the BARS device is considered as follows. 1) the internal anvil has good thermal conductivity, 2) the volume and mass of the oil layer, which is the pressure medium, was small, and 3) there was no mechanism to control the pressure in the first place. In the present invention, solutions for the above 2) and 3) have already been presented. The first explanation is 1) setting the thermal conductivity of the inner anvil and the temperature control method using it.

Example 8

The super hard materials used for the internal Anvil of the high-pressure cells include those made of metal and those made of ceramic. Metal ones include cemented carbide (WC+Co), tungsten (W), and the like. Those made of ceramics include zirconia (ZrO2), silicon nitride (Si3N4), cermet, boron carbide (B4C), silicon carbide (SiC), and the like. Table 7 shows the thermal conductivity of cemented carbide materials whose Vickers hardness (Hv) is comparable to that of cemented carbide. As shown in Table 7, metal ones have high thermal conductivity, and ceramic ones other than silicon carbide (SiC) have low thermal conductivity.

TABLE 7

| Material abbreviation | melting point (° C.) | Vickers hardness Hv (N/mm$^2$) | Coefficient of thermal expansion ($10^{-6}$/K) | Thermal conductivity (W/mK) | metal | ceramics |
|---|---|---|---|---|---|---|
| $ZrO_2$ | 2715 | 1400 | 9.5 | 3 | | ○ |
| $Si_3N_4$ | 2173 | 1800 | 3.4 | 20 | | ○ |
| SM | 1700 | 1800 | 8.3 | 27 | | ○ |
| $B_4C$ | 2400 | 3000 | 4.7 | 30 | | ○ |
| WC + Co | 2800 | 1700 | 6.0 | 85 | ○ | |
| SiC | 2173 | 2300 | 4.7 | 90 | | ○ |
| W | 3380 | 1900 | 4.5 | 177 | ○ | |

Abbreviated note)
$ZrO_2$: zirconia,
$Si_3N_4$: silicon nitride,
SM: cermet,
$B_4C$: boron carbide,
WC + Co: cemented carbide,
SiC: silicon carbide,
W: tungsten
note)
Characteristic values are normal temperature values.

In the present invention, heating of the processed material by the internal heating source is started at the same time as the pressure is increased by the pressurizing mechanism. To increase the pressure beyond the maximum pressure determined by the performance of the pressurizing mechanism, the pressure medium is thermally expanded by increasing the temperature to obtain the higher pressure.

In order to increase the temperature rise rate of the pressure medium, that is, the pressure increase rate, the super hard material of the anvil in the high-pressure cells should be the material with high thermal conductivity. Those shown in Table 7 are cemented carbide, silicon carbide, tungsten, or materials based on these.

On the other hand, to slow down the rate of pressurization of the pressure medium, the super hard material of the anvil in the high-pressure cells should be the material with low thermal conductivity. Shown in Table 7 are low zirconia, silicon nitride, cermet, boron carbide, or materials based on these. As a result, the influence of the internal heating source can be eliminated as much as possible.

In the present description of the present invention, pressure medium contact type (wet process) and pressure medium non-contact type (dry process) are described mixed in the same document. So, each entry should indicate which one it belongs to. Table 8 shows the function and configuration of the high-temperature and high-pressure processing equipment containing two or more High-pressure cells described above, and the correspondence relationship between wet process and dry process.

TABLE 8

| No | Functions and configuration of high-temperature and high-pressure processing equipment using liquid medium hydrostatic pressurization containing two or more high-pressure cells | | Pressure medium contact type (Wet processing) | pressure medium non-contact type (Dry process) |
|---|---|---|---|---|
| 1) | High-pressure vessel, press frame, pressure mechanism | | ○ | ○ |
| 2) | Liquid pressure medium with known compression and expansion coefficients | | ○ | ○ |
| 3) | Pressure medium heater, cooling jacket | | ○ | ○ |
| 4) | Arrangement of | Vertical/suspension | ○ | Δ |
| 5) | high-pressure | Horizontal/stationary | ○ | ○ |
| 6) | vessel and support system of high-pressure cell | Horizontal/Sliding | ○ | — |
| 7) | Heat and fluid resistant elastic seal | | ○ | — |
| 8) | A pair of molds (upper and lower) and guide mechanism | | — | ○ |
| 9) | Heat-resistant penetrating tube, metal mesh spring tube | | — | ○ |
| 10) | Gravity type pressure medium adjustment tank | | Δ | ○ |
| 11) | Types of high-pressure cells (Sphere, hexahedron, octahedron) | | ○ | ○ |
| 12) | Thermal convection of pressure medium by thermosiphon | | ○ | ○ |
| 13) | Partition plate (support plate), average temperature measurement copper plate | | ○ | ○ |

TABLE 8-continued

| No | Functions and configuration of high-temperature and high-pressure processing equipment using liquid medium hydrostatic pressurization containing two or more high-pressure cells | Pressure medium contact type (Wet processing) | pressure medium non-contact type (Dry process) |
|---|---|---|---|
| 14) | Temperature measurement (maximum, minimum, average) and control | ○ | ○ |
| 15) | Check valve with detachable pressure mechanism | ○ | ○ |
| 16) | Shared pressurization mechanism by multiple high-pressure vessels | ○ | ○ |

explanatory notes
○: correlated,
Δ: slightly correlated,
—: no correlation

In the above description, the high-temperature and high-pressure processing apparatus of the liquid medium pressurization type was explained as the apparatus for producing large-sized synthetic diamonds. However, the material produced by the apparatus need not be limited to large size synthetic diamonds. In addition to synthetic diamonds, the following substances can be produced: cubic boron nitride (cBN) and its analogues, and ceramic materials, hard materials, intermetallic materials, and compacts thereof, including sintered products, produced using high pressure. The method of the present invention can be applied to products manufactured by this high temperature high-pressure (HPHT) manufacturing equipment.

EXPLANATION OF LETTERS OR NUMERALS

1. Split-Type High-Pressure Vessel.
2. Split Frame.
3. External Anvil (Eight Division).
4. Internal Anvil (Six Division).
5. Current and Instrumentation Lead.
6. Pressure Medium.
7. Main Part of High-Pressure Vessel (Body).
8. Lid of High-Pressure Vessel (Lid).
9. High-Pressure Cells.
10. Pressurizing Mechanism.
11. Check Valve.
12. Slice Valve.
13. Processed Material.
14. Internal Heating Source.
15. Anvil.
16. Internal Thermocouple.
17. Connection Cable.
18. Waterproof Pressure Connector.
19. Seal of Fluid-Proof [Heat-Resistant] Elastic Material. (Heat- and Fluid-Resistant Elastic Material)
20. Binding Mechanism.
21. Source Power Supply of Internal Heating.
22. High Pressure Vessel Thermocouple.
23. Temperature Detecting Function.
24. Pressure Regulation Function.
25. Temperature Decrease Mechanism.
26. Refrigerant Cooler.
27. Cooling Jacket.
28. Heating Mechanism.
29. Hydraulic-Medium Heating Heater Power Supply. (Pressure medium heater power supply)
30. Hydraulic-Medium Heating Heater. (Pressure medium heater)
31. Partition Plate. (Support Plate)
32. Piezoelectric Sensor.
33. Press Frame.
34. Rail.
35. Movable Cart.
36. Pressurization Pump.
37. High-pressure Hose.
38. Pressure Medium Tank.
39. Lower Molding Die.
40. Upper Molding Die.
41. Upper Molding Die Mounting Jig.
42. Gravity Equation Pressure-Medium Equalizing Tank.
43. Heat-Resistant Penetrating Tube.
44. High-pressure cell Cooling Water Piping.
45. Atmospheric Escape Pipe.
46. Processing Pit.
47. Lower Support Mechanism.
48. Pressure-Medium Circulation Layer.
49. Folded-Type Vacuum Exhaust Port.
50. Vacuum Pump.
51. Lower External Anvil.
52. Upper External Anvil.
53. Notching.
54. Suction Pipe-Connection Box.
55. Decompressing Mechanism.
56. High-pressure cell of All the Edge Portion Excision Articles (All tip portions cut-off high-pressure cells).
57. Metallic Net Spring Pipe.
58. Upper Hydraulic-Medium Slice Valve.
59. Hydraulic-medium Equalizing Tank Slice Valve.
60. Atmospheric Release Valve.
61. Vacuum Pump Valve.
62. Hydraulic-Medium Atmosphere Release Valve.
63. Pressure Transmitter.
64. Press Fit Mouth of Oil Medium.
65. Copper Plate for Mean-Temperature Measurement.

The invention claimed is:

1. A processing apparatus capable of high-temperature and high-pressure processing in which uniform pressure is applied without directionality simultaneously to two or more high-pressure cells, wherein:

a high-pressure vessel is vertically or horizontally placed in a hydrostatic pressurization system in which outer surfaces of all materials inside the high-pressure vessel are isotopically pressurized by applying pressure to a liquid pressure medium that fills the high-pressure vessel;

a high-pressure cell is accommodated inside the high-pressure vessel, the high-pressure cell having a surface provided with an elastic and fluid intrusion resistant sealing material having a deflection temperature under load of 200° C. or more;

the pressure medium being used is a pressure medium whose compressibility due to pressure and volume change rate due to temperature are known;

a heating mechanism heating the pressure medium, and a measurement means measuring an average temperature in a vertical direction of the pressure medium are provided inside the high-pressure vessel;

a cooling mechanism is provided at a higher point than a center position in the vertical direction outside the high-pressure vessel;

a pressurizing mechanism capable of pressurizing the pressure medium from outside the high-pressure vessel is operated first to pressurize the pressure medium to a certain pressure level;

the pressure medium that has filled the high-pressure vessel is heated to a desired temperature to cause thermal expansion thereof; and the processing is continued while maintaining a desired pressure with continued measurement of pressure and temperature even after the pressurizing mechanism is stopped, wherein, when the pressure is low, a pressure regulation function operates the heating mechanism to increase the pressure by thermal expansion accompanying the heating of the pressure medium, and when the pressure is high, the pressure regulation function operates the cooling mechanism to reduce the pressure.

2. The processing apparatus capable of high-temperature and high-pressure processing in which uniform pressure is applied without directionality simultaneously to two or more high-pressure cells according to claim 1, wherein the processing apparatus comprises at least one pressure medium pressurizing mechanism that the processing apparatus can use first;

the pressure medium being used is a liquid pressure medium having a ratio of volume expansion caused by heat at 150° C. greater than a ratio of volume compression caused by pressure at 500 MPa;

the heating mechanism heating the pressure medium is provided inside the high-pressure vessel;

the cooling mechanism is provided at a higher point than a center position in the vertical direction outside the high-pressure vessel;

a means for measuring temperatures is provided for measuring an average temperature in the vertical direction through measurement of surface temperatures of a high thermal conductivity member that is attached to a surface along the vertical direction of a support plate that is installed over an entire length in the vertical direction of the high-pressure vessel;

means for measuring temperatures are provided at positions of a highest point and a lowest point of the temperature determined by thermal flows of the pressure medium inside the high-pressure vessel;

the temperature of the pressure medium that has filled the high-pressure vessel is controlled by the heating mechanism and the cooling mechanism for the pressure medium; and thermal expansion caused by heating the pressure medium is utilized to raise the pressure inside the high-pressure vessel to a higher level than a value reached by use of the pressurizing mechanism.

3. The processing apparatus that performs hydrostatic pressurization using a liquid pressure medium inside a horizontally placed high-pressure vessel according to claim 1, characterized in that the processing apparatus comprises a pair of molds that fit together at their lower and upper portions and have elastic and fluid intrusion resistant surfaces having a deflection temperature under load of 200° C. or more, and at least one pressure medium pressurizing mechanism that the processing apparatus can use first;

the pressure medium being used is a pressure medium whose compressibility due to pressure and volume change rate due to temperature are known;

a heating mechanism heating the pressure medium, and a measurement means measuring an average temperature in the vertical direction of the pressure medium are provided inside the high-pressure vessel;

a cooling mechanism is provided at a higher point than a center position in the vertical direction outside the high-pressure vessel;

an upper mold, which is a columnar vessel, is fixedly attached to a lower surface of a lid of the high-pressure vessel, with a pipe for injecting the pressure medium and a pipe leading to a vessel for collecting the pressure medium connected thereto;

a lower mold in a hollow cylindrical shape with a bottom, including a recess for accommodating a high-pressure cell and an opening thereabove, is fixedly attached to an inner wall of a body of the high-pressure vessel;

a pipe for injecting the pressure medium is connected to the body of the high-pressure vessel;

after a high-pressure cell has been accommodated in the recess of the lower mold, the processing apparatus performs a process comprising a first step, during lid tightening of the high-pressure vessel, in which the lid is lowered as the upper mold is inserted into the lower mold by remote control by means of a tapered guide mechanism in a lower portion of the upper mold, a second step in which an atmosphere in a space between the upper mold and the lower mold is evacuated to vacuum immediately before the lid and the body come into close contact with each other to bring both molds into close contact with each other, a third step in which the pressure medium that has filled the upper mold in advance is squeezed out and collected to a vessel installed above in a vertical direction when the lid and the body make close contact with each other, and a fourth step after lid tightening, in which an entire inner surface of the upper mold and an entire outer surface of the lower mold that are in liquid communication are hydrostatically pressurized simultaneously with the same pressure medium, whereby the pressure medium that has filled the high-pressure vessel is heated to a desired temperature to cause thermal expansion thereof, whereby the processing is continued while maintaining the pressure even after the pressurizing mechanism is stopped, and whereby hydrostatic pressurization is performed in which two or more high-pressure cells are uniformly pressurized without contacting the pressure medium.

4. The processing apparatus according to claim 1, wherein high-pressure cells of two or more kinds of shapes can be subjected to simultaneous high-temperature and high-pressure processing, provided that the two or more high-pressure cells each have a totally symmetric shape.

5. The processing apparatus according to claim 1, wherein the two or more high-pressure cells are one or more of a regular hexahedron, a regular octahedron, a hexahedron/octahedron with all their corners cut off to form faces, or a segmented sphere.

6. The processing apparatus according to claim 1, wherein one or more of toluene, ethanol, methanol, benzene, acetone, and a liquid mixture of these organic solvents is used for the pressure medium.

7. The processing apparatus according to claim 1, wherein the pressure medium is a liquid mixture of one or more of ethanol, methanol, and acetone, and water, with a controlled mixing ratio, for more refined thermal expansion rate control, which enables more accurate pressure control through measurement and control of temperatures.

8. The processing apparatus according to claim 1, wherein heat sources inside the high-pressure vessel that is cylindrical are aligned and placed in a central position from a lower portion to a middle portion in the vertical direction, while a cooling function provided by a cooling medium is placed outside the high-pressure vessel in an upper portion in the vertical direction, with a partition plate made of a low thermal conductivity material blocking flows of the pressure medium therebetween, whereby a structure is configured in which a thermosiphon is created in vertical opposite directions, to enable more exact determination of positions of a highest point and a lowest point of temperature that are determined by the thermosiphon, and to enhance temperature measurement and control accuracy by measurement of a maximum temperature and a minimum temperature.

9. The processing apparatus according to claim 8, wherein a thin, elongated plate-like material having a high thermal conductivity is attached on a surface of the partition plate over an entire length in the vertical direction, and temperatures of this surface are measured to enable more accurate measurement of an average temperature in the vertical direction of the pressure medium.

10. The processing apparatus according to claim 1, wherein a selection of thermal conductivity of an anvil made of an ultra-hard material inside the high-pressure cells enables pressurizing speeds and target pressures of the pressure medium inside the high-pressure vessel to be changed.

11. The processing apparatus according to claim 10, wherein the anvil inside the high-pressure cells is made of a material having a low thermal conductivity to allow itself to be used in a control of reducing pressurizing speed, including zirconia, silicon nitride, cermet, boron carbide, and materials mainly composed of these.

12. The processing apparatus according to claim 1, further comprising a check valve that operates in a direction in which a piping path of the pressure medium is closed when a temperature rise of the pressure medium has led to a higher pressure inside the high-pressure vessel than pressure inside the pressurizing mechanism, which makes it possible to disconnect the piping path from the pressurizing mechanism to the high-pressure vessel on a pressurizing mechanism side of the check valve during the high-temperature and high-pressure processing.

13. The processing apparatus according to claim 1, wherein a piping path extending from the pressurizing mechanism is connectable to another high-pressure vessel to enable shared use of the one pressurizing mechanism among a plurality of high-pressure vessels.

14. The processing apparatus according to claim 1, wherein the high-temperature and high-pressure processing can be continued for over 8 hours or more even after the pressurizing mechanism is disconnected, with the two or more high-pressure cells inside taking up the high-pressure vessel.

15. A processing apparatus that performs hydrostatic pressurization using a liquid pressure medium inside a horizontally placed high-pressure vessel, characterized in that the processing apparatus comprises a pair of molds that fit together at their lower and upper portions and have elastic and fluid intrusion resistant surfaces having a deflection temperature under load of 200° C. or more, the molds including an upper mold, which is a columnar vessel fixedly attached to a lower surface of a lid of the high-pressure vessel, with a pipe leading to a vessel for injecting the pressure medium and a pipe for collecting the pressure medium connected thereto, and a lower mold in a hollow cylindrical shape with a bottom, including a recess for accommodating a high-pressure cell and an opening thereabove, the lower mold being fixedly attached to an inner wall of a body of the high-pressure vessel, a pipe for injecting the pressure medium being connected to the body of the high-pressure vessel;

wherein, after a high-pressure cell has been accommodated in the recess of the lower mold, the processing apparatus performs a first step, during lid tightening of the high-pressure vessel, in which the lid is lowered as the upper mold is inserted into the lower mold by remote control by means of a tapered guide mechanism in a lower portion of the upper mold, a second step in which an atmosphere in a space between the upper mold and the lower mold is evacuated to vacuum immediately before the lid and the body come into close contact with each other to bring both molds to close contact with each other, a third step in which the pressure medium that has filled the upper mold in advance is squeezed out and collected to a vessel installed above in a vertical direction when the lid and the body make close contact with each other, and a fourth step after lid tightening, in which an entire inner surface of the upper mold and an entire outer surface of the lower mold that are in liquid communication are hydrostatically pressurized simultaneously with the same pressure medium, whereby the processing apparatus is capable of hydrostatic pressurization in which two or more high-pressure cells are uniformly pressurized without contacting the pressure medium.

16. The processing apparatus according to claim 15, wherein the pair of molds is made of a material that is any of a silicone rubber, nitrile rubber, fluor rubber, heat-resistant fluorine resin, or a composite material including these.

17. The processing apparatus according to claim 15, further comprising a mesh-like or porous medium flow mechanism that supports the high-pressure cells weighing 10 kg or more in the direction of gravity via the lower mold to allow for the high-temperature and high-pressure processing without obstructing flows of the pressure medium.

* * * * *